United States Patent
Wentworth et al.

(10) Patent No.: US 7,500,651 B2
(45) Date of Patent: Mar. 10, 2009

(54) PORTABLE WINCH

(75) Inventors: Steven W. Wentworth, Brookfield, WI (US); Paul W. Hau, Watertown, WI (US)

(73) Assignee: Earth Tool Company, L.L.C., Oconomowoc, WI (US)

( * ) Notice: Subject to any disclaimer, the term of this patent is extended or adjusted under 35 U.S.C. 154(b) by 0 days.

(21) Appl. No.: 11/438,568

(22) Filed: May 22, 2006

(65) Prior Publication Data

US 2006/0231815 A1 Oct. 19, 2006

Related U.S. Application Data

(63) Continuation of application No. 10/666,592, filed on Sep. 19, 2003, now Pat. No. 7,048,257.

(51) Int. Cl.
*B66D 1/00* (2006.01)

(52) U.S. Cl. ............... 254/323; 254/282; 254/328; 212/296; 212/297; 212/299; 212/306

(58) Field of Classification Search ......... 254/279–282, 254/323, 326, 328, 335; 212/294–297, 299, 212/302, 306, 348
See application file for complete search history.

(56) References Cited

U.S. PATENT DOCUMENTS

| | | | | |
|---|---|---|---|---|
| 2,919,107 | A * | 12/1959 | Halbrook et al. | 254/336 |
| 3,100,625 | A * | 8/1963 | Back | 254/335 |
| 3,181,302 | A * | 5/1965 | Lindsay | 405/156 |
| 3,638,806 | A * | 2/1972 | Hippach | 212/231 |
| 3,889,818 | A * | 6/1975 | Wennerstrom | 212/349 |
| 4,457,647 | A * | 7/1984 | Dusette et al. | 405/184.1 |
| 4,507,019 | A * | 3/1985 | Thompson | 405/184.3 |
| 4,516,637 | A * | 5/1985 | Winckler | 166/377 |
| 4,685,831 | A * | 8/1987 | Mahoney | 405/156 |
| 5,078,364 | A * | 1/1992 | Harrell | 254/387 |
| 5,192,165 | A * | 3/1993 | Torielli | 405/156 |
| 5,211,509 | A * | 5/1993 | Roessler | 405/184 |
| 5,232,205 | A * | 8/1993 | McVaugh | 254/134.3 R |
| 5,328,297 | A * | 7/1994 | Handford | 405/184 |
| 5,516,080 | A * | 5/1996 | McVaugh | 254/134.3 FT |
| RE35,542 | E * | 6/1997 | Fisk et al. | 405/156 |
| 6,086,050 | A * | 7/2000 | Wiederkehr et al. | 254/266 |
| 6,109,832 | A * | 8/2000 | Lincoln | 405/184 |
| 6,152,425 | A * | 11/2000 | Boyer | 254/323 |
| 6,181,302 | B1 * | 1/2001 | Lynde | 345/7 |
| 6,234,453 | B1 * | 5/2001 | Block | 254/285 |
| 6,261,027 | B1 * | 7/2001 | Wentworth et al. | 405/184 |

(Continued)

*Primary Examiner*—Emmanuel M Marcelo
(74) *Attorney, Agent, or Firm*—Philip G. Meyers

(57) ABSTRACT

A portable winch suitable for use in underground pipe bursting and replacement includes a mounting frame positionable at a top opening of a hole such as a receiving pit or manhole. A telescoping mast having a series of nested, top and bottom mast sections is mounted on the frame. A powered winch unit, also mounted on the frame, includes a drive unit and a cable. A guide assembly includes a sheave that guides the cable from the drive unit to the bottom mast section. Suitable means are connected to the frame for mechanically raising and lowering the mast into and out of the hole. As such, the mast according to the invention does not require assembly or disassembly at the beginning and end of each job. The mechanical means for raising and lowering the mast is preferably the powered winch unit.

11 Claims, 21 Drawing Sheets

U.S. PATENT DOCUMENTS 6,443,657 B1 * 9/2002 Brahler .................... 405/154.1
6,494,437 B1 * 12/2002 Boyer ......................... 254/323
6,679,284 B1 * 1/2004 Raymond ................... 137/351
6,823,888 B1 * 11/2004 Raymond ................... 137/351
2002/0070187 A1 * 6/2002 Willim ....................... 212/299

* cited by examiner

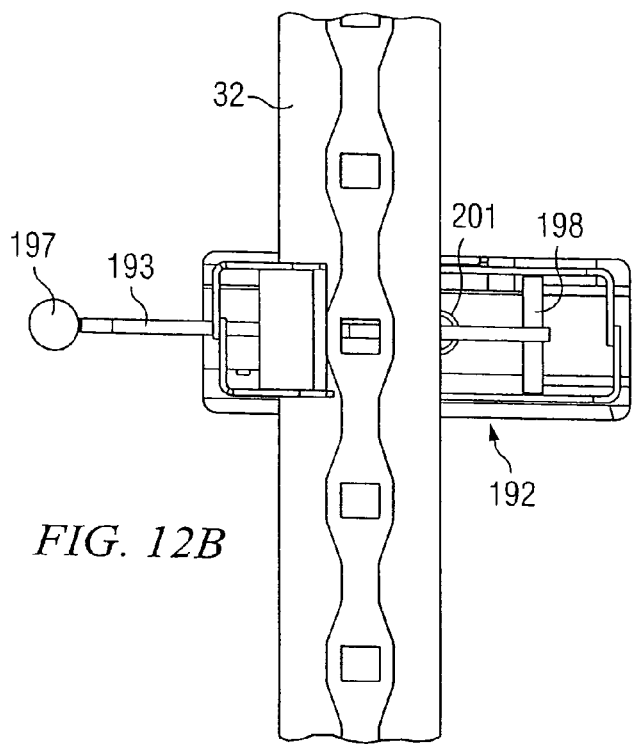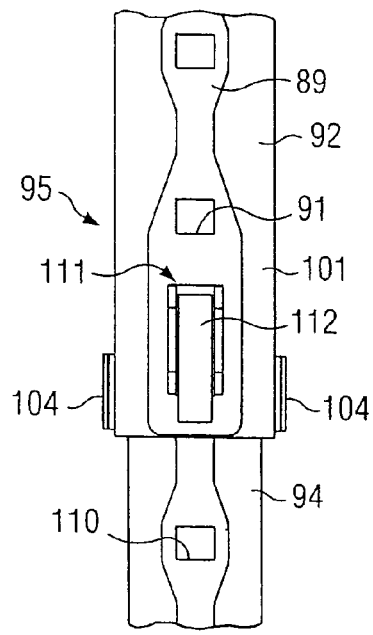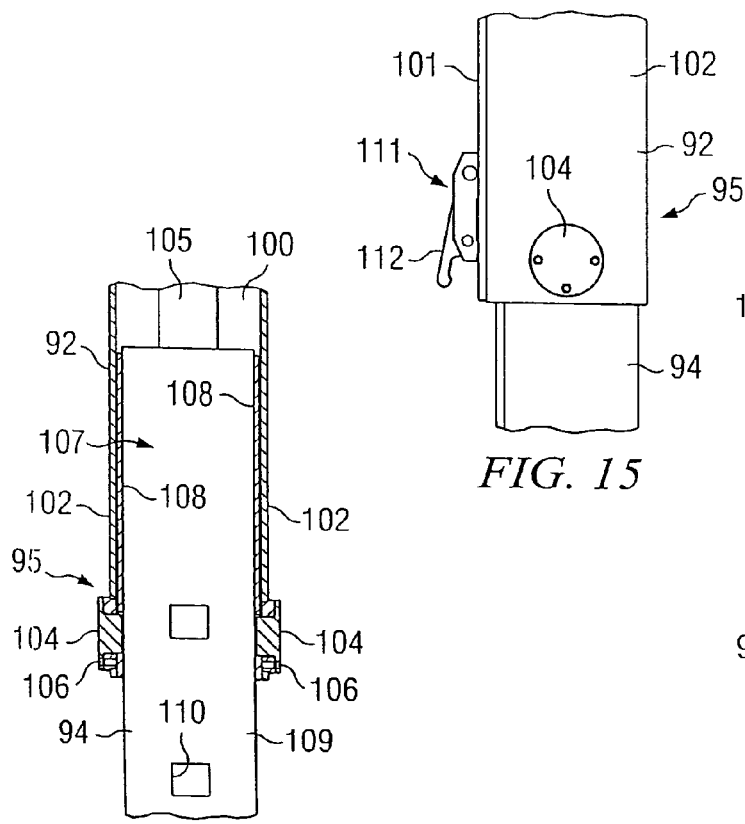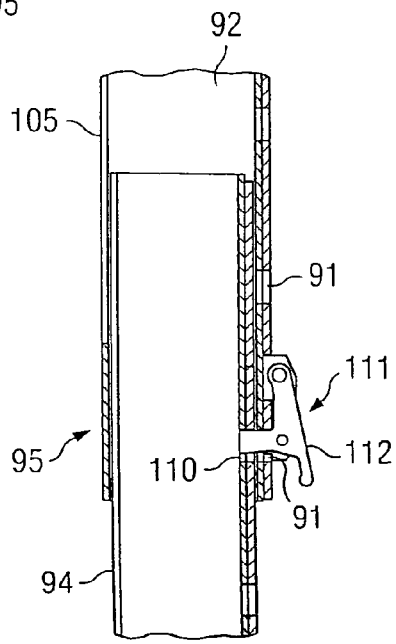
FIG. 12B
FIG. 13
FIG. 14
FIG. 15
FIG. 16

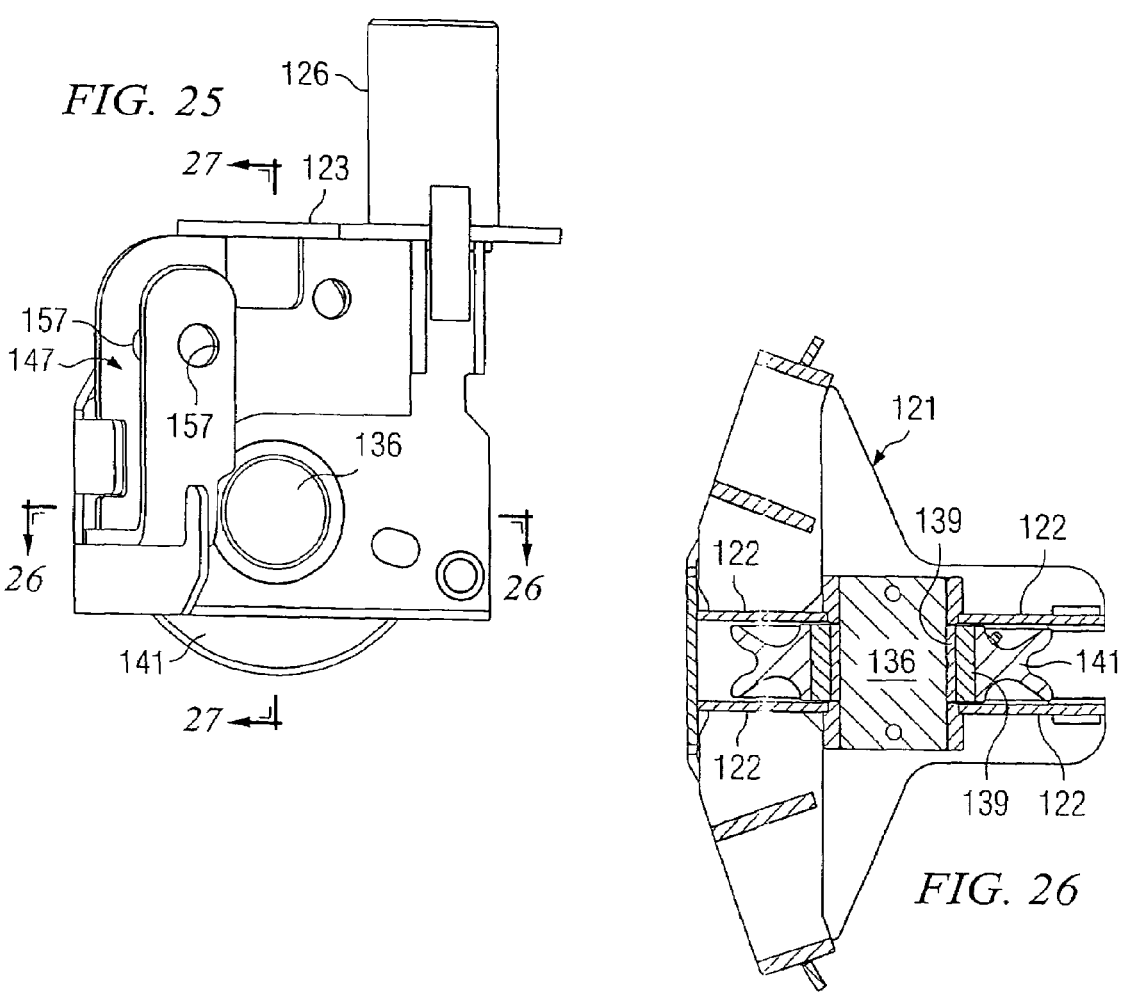
FIG. 25
FIG. 26
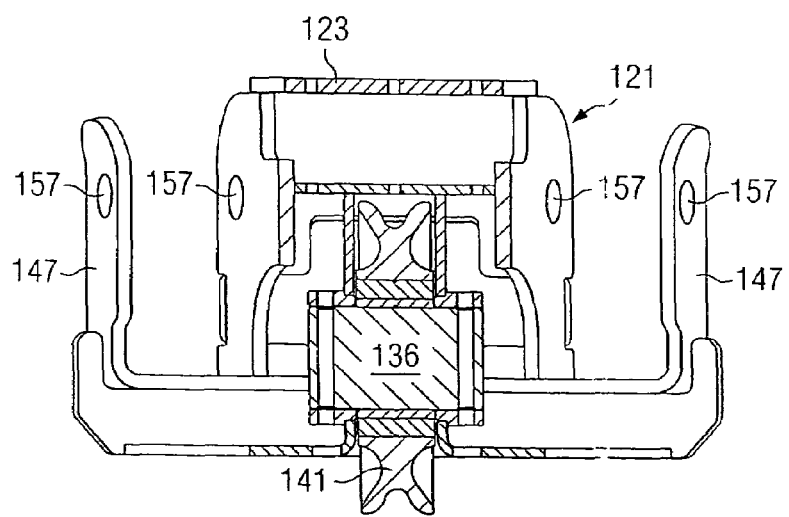
FIG. 27

PORTABLE WINCH

RELATED APPLICATION

This application is a continuation of U.S. application Ser. No. 10/666,592, to Wentworth et al., filed Sep. 19, 2003, now U.S. Pat. No. 7,048,257.

FIELD OF THE INVENTION

This invention relates to winches for pulling cables, particularly a portable winch used to pull an underground conduit during a pipe installation or replacement operation.

BACKGROUND OF THE INVENTION

The process of pipe bursting to replace buried frangible pipes has been in commercial existence since the late 1980's. While originally developed with the intent of replacing cast iron natural gas pipelines in Europe, it is of great promise within the continental U.S. to remedy problems with sewer systems.

Our sanitary sewer systems are constantly a source of contamination for freshwater ecosystems. Ground water, present in great abundance after rainfall around sewer pipes actually enters the sewer system. It will enter the system as it has ingress through gaps, fractures and other leaks in the old and deteriorated pipes present in all older systems. By entering the sanitary system, the groundwater must be treated as sanitary waste.

Unfortunately, the rate of inflow of groundwater after a rainfall is often 2 to 4 times the systems normal flow rate. When this happens, the processing rate can't keep up with the inflow rate, the untreated sewage must be discharged back into the ecosystem, normally finding it's way to a freshwater lake or stream. It is after this type of event that 'No Swimming' signs are posted at beaches and other warnings are made by news media about raw sewage flowing into water ways.

There are four remedies for this problem. The first is traditional open cutting, digging of open trenches to replace the old leaking pipes. It has an excellent end product, however it involves massive disruption on the surface and is generally an unpopular solution. The second involves digging of 'deep tunnels', nothing more than storage caverns for excess flow that is intended to be treated at a later date. This works until rain storms occur back to back and the capacity is exceeded. In addition, the condition or leak rate of the sanitary system is always increasing as the pipes age.

The third and fourth methods are variations of each other. In lining, whether cured in place pipe (CIPP) or slip lining, the pipe is temporarily patched. It stops the leak for a period of years, but in general it is a 'spot' repair, or nothing more than a thin liner. It is inevitable that the process will have to be undertaken again when the next aging joint in the system begins to open and permit leakage.

The fourth method, the most permanent, most adaptable and unquestionably the overall preferred method, is pipe bursting and replacement of sanitary sewer systems. It produces a brand new pipe with superior life and sealing capability. It is a trenchless process much as CIPP or lining is, producing little surface disruption; however, it has suffered the drawback of involving more physical labor than lining.

The present invention provides a device that reduces the amount of physical labor required to perform pipe bursting of sanitary sewer systems. Such a process most typically uses a pneumatic impact device to hammer a mole through the existing pipe and expand the surrounding soil. This mole is commonly attached to the HDPE (high density polyethylene) product pipe that becomes the new, leak proof pipe system. The mole is pulled through the old pipeline by a winch mounted at the receiving end of the line, with or without use of an impactor in addition to the pulling force exerted by the winch.

In many processes, a pneumatic impact hammer is used as the mole. To maintain progress of a pneumatic hammer towing a string of plastic replacement pipe, the hammer is normally guided by a wire rope drawn by a constant tension winch. The winch is at ground level, with a mast that extends downward from the winch into either a small excavation, or more likely a sewer manhole. This mast is a hollow tube through which the wire rope passes to reach the subterranean level of the pipe. After changing direction 90 degrees around a sheave, the wire rope will enter the pipe and traverse the entire length of the pipe to be burst and replaced.

The constant tension winch has the formidable task of keeping suitable tension (in this case 24,000 lb) on the wire rope, and winding the wire rope for storage between jobs while functioning with the mast and sheave described earlier. In addition, the unit must be mobile. Upon completion of a section of pipe bursting (typically 500 feet), the winch must move rapidly to the next section. It is desirous, but has not been the case, that setup and teardown of the winch and mast should be rapid and with a minimum of effort. This invention addresses that aspect of the process, and in doing so, makes the process of pipe bursting more efficient, more cost effective and more likely to be chosen as a rehabilitation method over other methods described.

Previous designs involved the assembly of mast sections on the surface, then lowering the mast into position using a lifting device such as a small mobile crane. After the mast was in position in the manhole, the winch was brought into place and the mast attached to the winch. Upon completing this, the wire rope was threaded through the hollow sections to the sheave. At this point the unit would be considered 'set up'. The process was performed in reverse to remove the winch upon completion of a pull.

Winches currently in use for underground pipe replacement generally include the Hydroguide series of winches sold by Vermeer. Handford U.S. Pat. No. 5,328,297 describes a pipe replacement system using a winch wherein the winch mast is deployed by lowering one of a pair of nested mast sections. This represents an advance over systems requiring complete manual assembly, but the job of deploying the mast and removing it when the job is completed is still a manual task.

SUMMARY OF THE INVENTION

A portable winch according to the invention suitable for use in underground pipe bursting and replacement includes a mounting frame positionable at a top opening of a hole, a telescoping mast including a plurality of hollow, nested, top and bottom mast sections, a mounting assembly by which the top mast section is secured to the mounting frame, a powered winch unit mounted on the frame, including a drive unit and a cable, positioned so that the cable can be fed into the telescoping mast, and mechanical means connected to the frame for raising and lowering the mast into and out of the hole by collapsing and uncollapsing the telescoping mast while it is secured to the mounting frame. As such, the mast according to the invention does not require assembly or disassembly at the beginning and end of each job. The mechanical means for raising and lowering the mast is preferably the powered winch unit, but other possible systems are discussed hereafter.

According to another aspect of the invention, that mast is mounted on the frame so that it can be pivoted from a storage position to an operating position and back again. Such a portable winch includes a mounting frame positionable at a top opening of a hole, a pivot mounted on the frame, a telescoping mast including nested, top and bottom mast sections, mounted to the frame by the pivot, a powered winch unit mounted on the frame, including a drive unit and a cable, a guide assembly including a sheave that guides the cable from the drive unit to the bottom mast section, and suitable means for releasably securing a leading end of the cable to the bottom mast section. By this means, the mast can be lowered into the hole beneath the frame by pivoting the mast into position for lowering, connecting the leading end of the cable to the mast, and then operating the winch unit to lower a bottom section of the mast. The mast can be raised out of the hole by connecting the leading end of the cable to the bottom mast section and pulling the cable with the winch unit to collapse the telescoping mast.

A method for installation of an underground pipe according to the invention using a portable winch such as the foregoing includes the steps of:

positioning a mounting frame of the portable winch at a top opening of a hole;

pivoting a telescoping mast including nested, top and bottom mast sections, which mast is mounted to the frame by the pivot, from a horizontal position to a vertical position;

lowering the bottom mast section into the hole by operating a mast control system that includes a mast cable and a mechanism that gradually pays out the mast cable to lower the bottom mast section;

securing the mast in the hole for horizontal pulling using a pulling cable wound over a sheave mounted on the mast;

feeding the pulling cable through a pipeline adjoining the hole and securing a pipe bursting mole having a replacement pipe attached to the cable;

operating a powered winch unit mounted on the frame to pull the pulling cable, mole and replacement pipeline through the pipeline in order to burst the pipeline and replace it with the replacement pipe;

unsecuring the mast in the hole so that is can be removed from the hole;

raising the bottom mast section up from the hole by operating the mast control system to gradually pull the lower mast section upwardly; and pivoting the mast about the pivot from a vertical position to a horizontal position.

These and other aspects of the invention are discussed in the detailed description that follows.

BRIEF DESCRIPTION OF THE DRAWINGS

In the accompanying drawing, wherein like numeral denote like elements:

FIG. 12B is a top view of the mast holding mechanism shown in FIG. 12A;

FIG. 13 is a rear view of the upper mast joint shown in FIG. 12;

FIG. 14 is the same view as FIG. 13, with the top mast in lengthwise section;

FIG. 15 is a left side view of the upper mast joint shown in FIG. 12;

FIG. 16 is a right side lengthwise sectional view of the upper mast joint shown in FIG. 12;

FIG. 25 is a side view of the frame of the of the foot assembly of FIG. 24;

FIG. 26 is a sectional view taken along the line 26-26 in FIG. 25;

FIG. 27 is a sectional view taken along the line 27-27 in FIG. 25;

Figure 1:
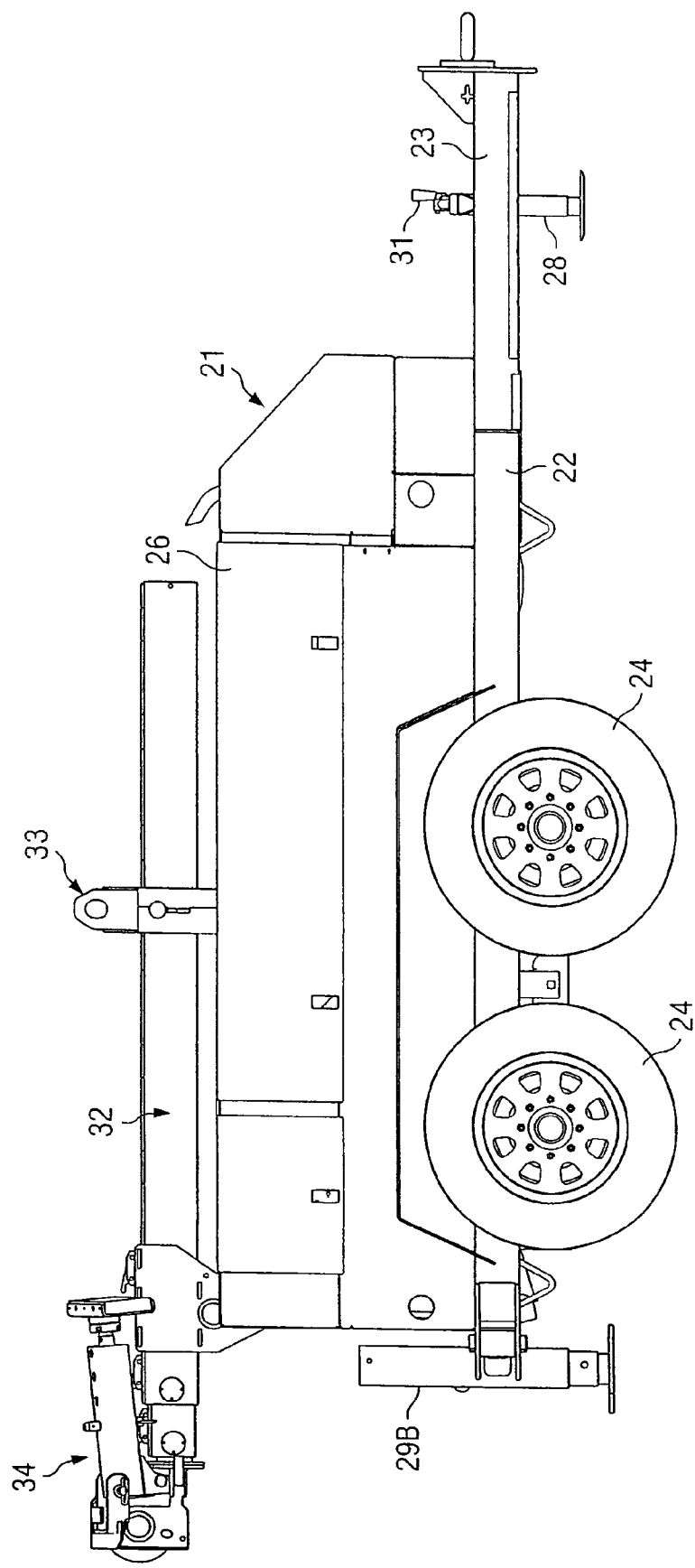
FIG. 1 is side view of a portable winch unit according to the invention in a storage position.
Figure 2:
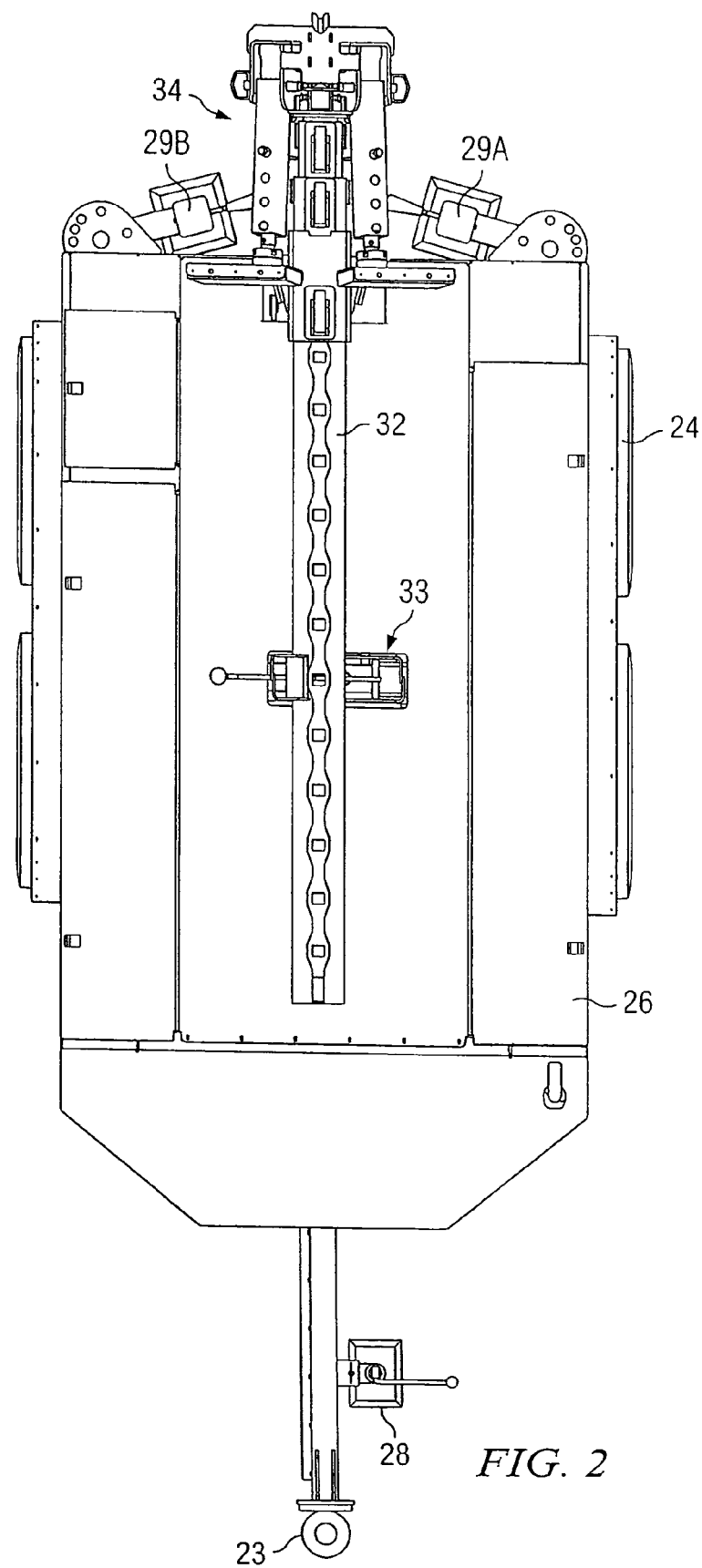
FIG. 2 is a top view of the winch shown in FIG. 1.
Figure 3:
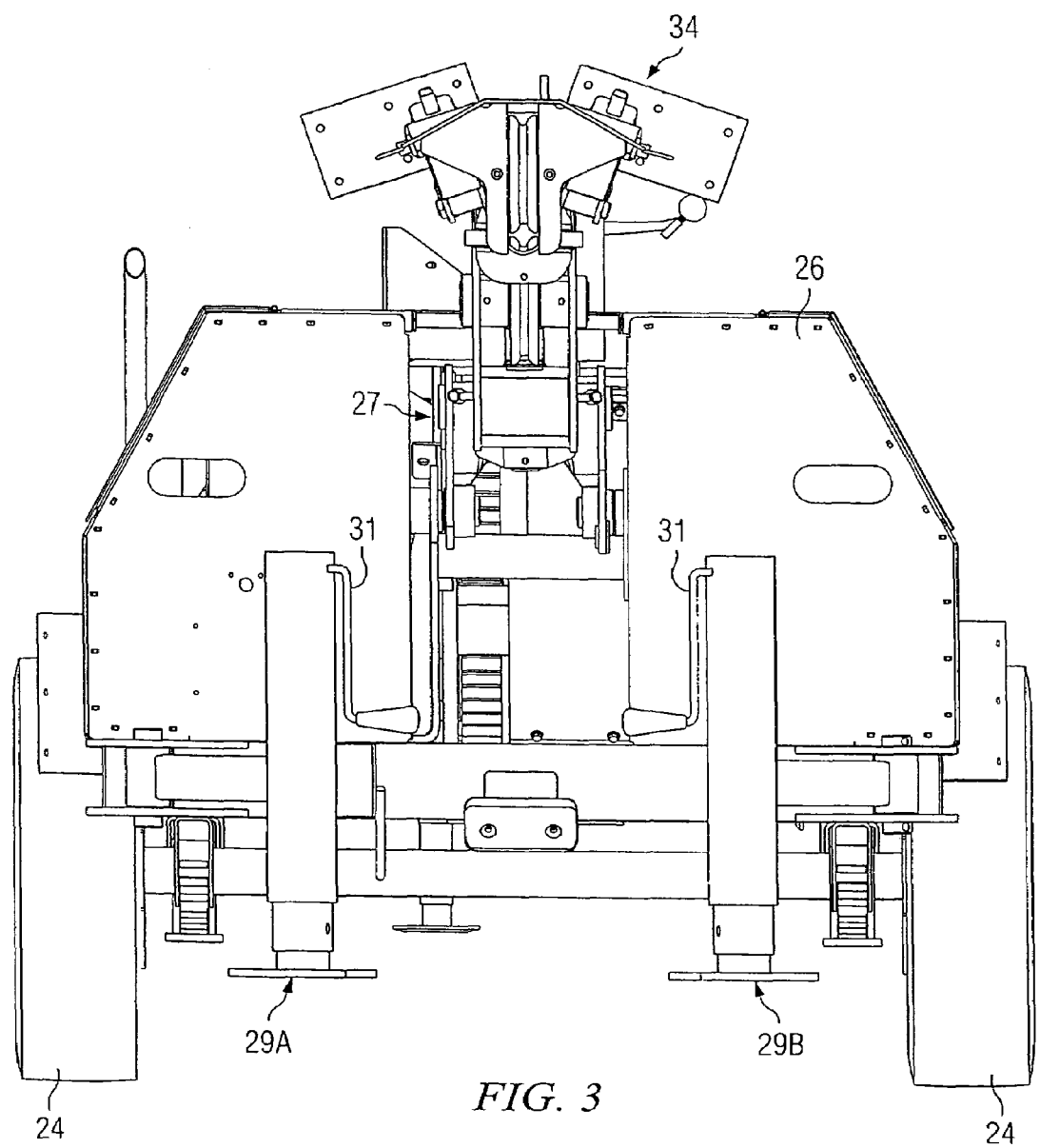
FIG. 3 is a rear end view of the winch unit shown in FIG. 1.
Figure 4:
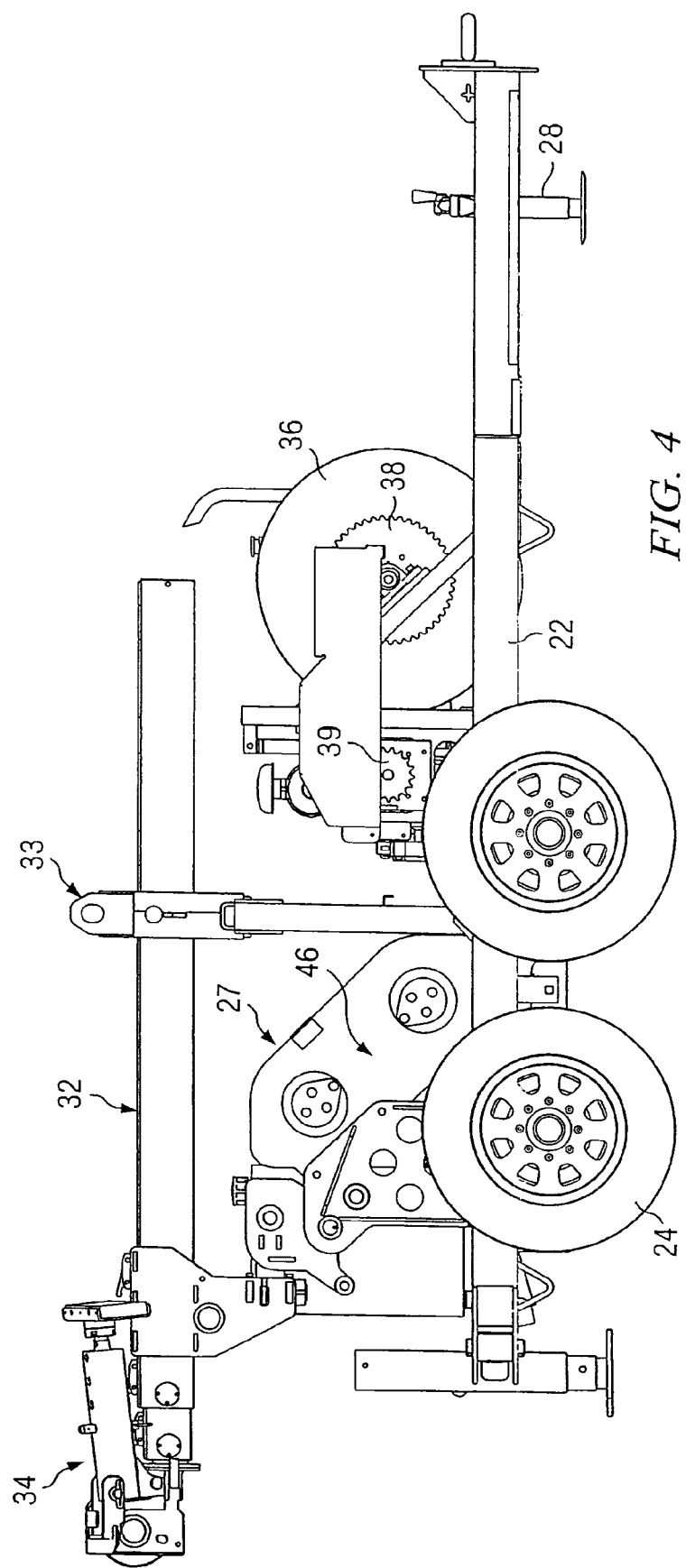
FIG. 4 is a side view of the winch unit shown in FIG. 1 with housing and components removed to show the cable pulling mechanism.

In the drawings, welded connections between parts secured rigidly together are used unless noted otherwise. Fluid hoses for hydraulic fluid are omitted for clarity.

DESCRIPTION OF PREFERRED EMBODIMENTS

Referring to FIGS. 1-6, a portable winch unit 21 according to the invention includes a frame 22 such as a trailer which can be pulled to a site by means of a trailer hitch 23 and tires 24. A vehicle housing 26 covers the winch mechanism 27. Front and rear jacks 28, 29A and 29B manually operable by means of cranks 31 permit the unit to be securely mounted on the ground once the job site has been reached. A telescoping mast assembly 32 is stowed horizontally in a collapsed position over the top center of housing 26 and secured thereto by a latch mechanism 33. Mast assembly 32 has a collapsible foot assembly 34 at its distal (bottom) end which is deployed as described hereafter once the telescoping mast has entered the hole adjoining the pipeline to be burst.

FIGS. 3-6 show details of winch mechanism 27. A storage spool 36 for a wire rope (not shown) is mounted towards the front of frame 22 and is driven to wind the rope by a hydraulic motor 37 that drives a sprocket 38 by means of a drive sprocket 39 and chain (not shown.) In this embodiment, hydraulic motor 37 is powered by means of hydraulic fluid provided through hoses (not shown) from a hydraulic pump 41. Pump 41 is powered by means of a diesel engine 42 and receives hydraulic fluid through hoses from a reservoir 44. Motor 37 is designed to provide a constant pulling force sufficient to keep the wire rope in tension. A winding guide 43 assures even winding of the cable onto spool 36 during pullback.

A dual capstan drive unit 46 is powered by a hydraulic motor 47 that receives hydraulic fluid from pump 41. Motor 47 is provided with a planetary gear reducer 48 for driving a central pinion gear 50 (FIG. 10) that meshes with and drives a pair of driven gears 49 of drive unit 46. Driven gears 49 are affixed to a pair of drums 51, 52 (FIGS. 8, 9) which pull the wire rope as described hereafter. Drive unit 46 can be operated to pay out or reel in the wire rope. This type of winch drive arrangement is generally known in the art.

Figure 8:
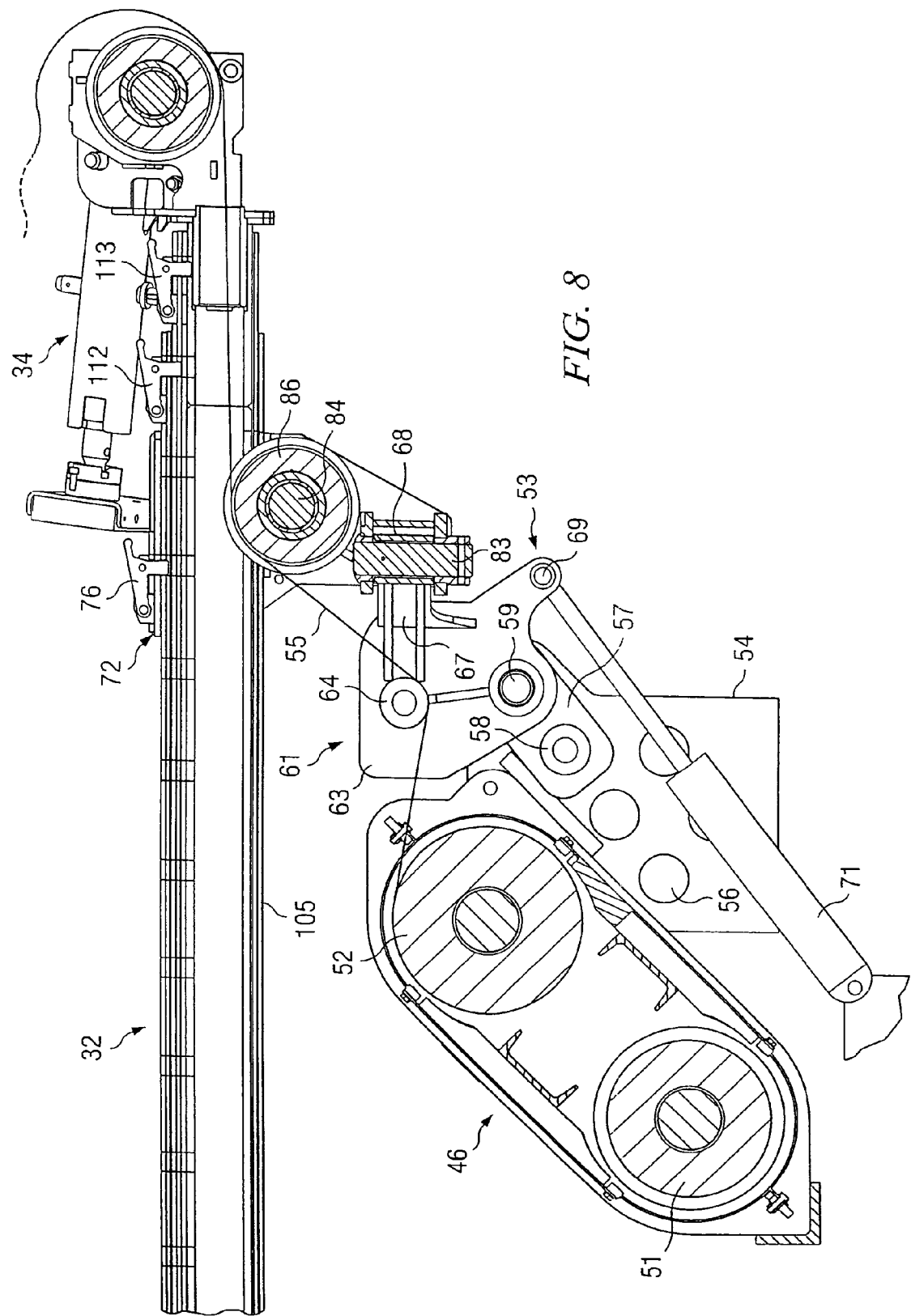
FIG. 8 is a partial, right side lengthwise sectional view of the cable pulling mechanism of the winch unit of FIG. 2 with the mast stowed.

As shown in FIGS. 7 through 11, winch mechanism 27 of the invention serves a dual purpose. It operates the main capstan drive 46 to pull the cable with attached mole and burst a pipe, and also is used to raise and lower the telescoping mast. FIG. 8 illustrates the mast assembly 32 and foot assembly 34 in stowed positions prior to use.

Figure 11:
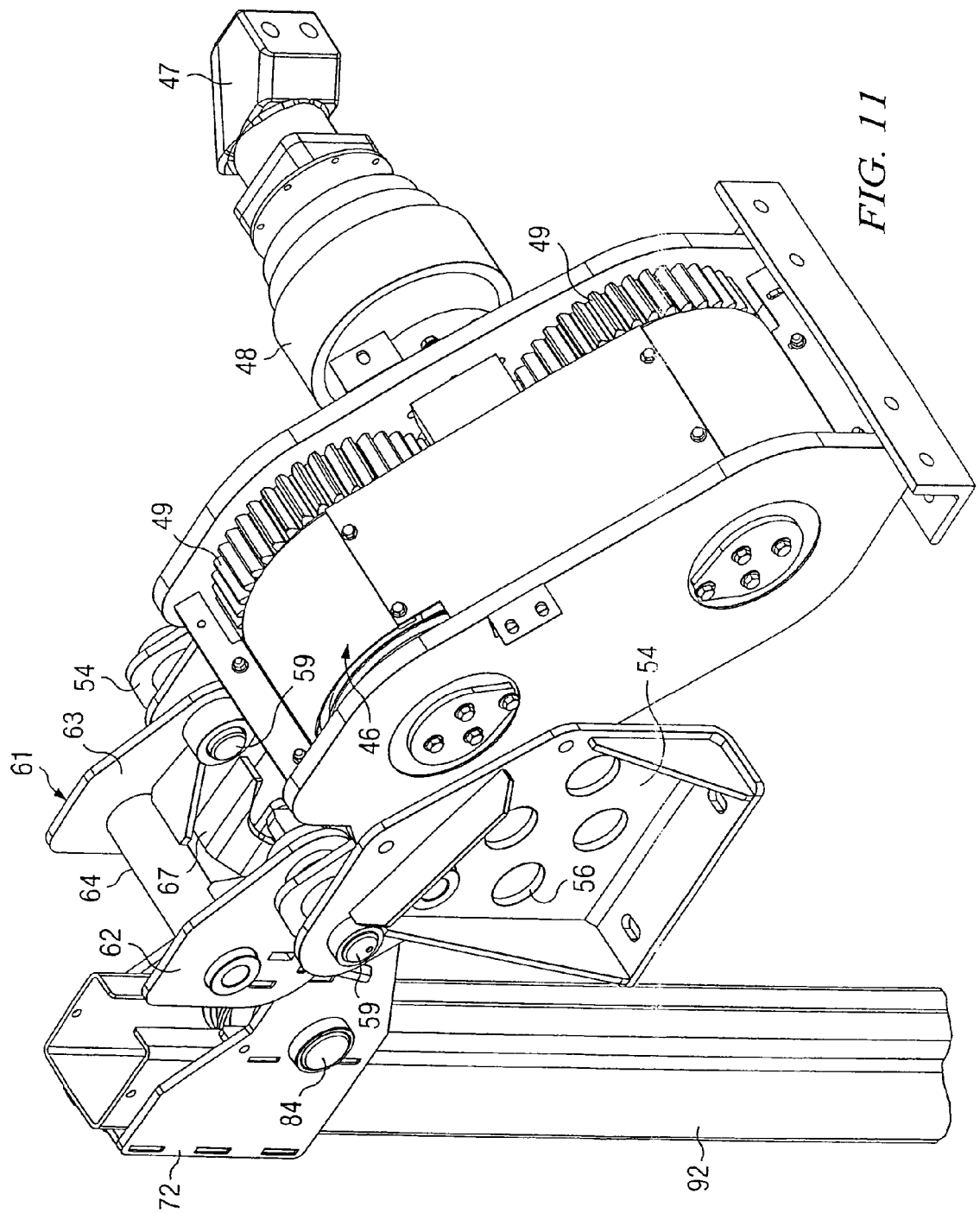
FIG. 11 is a partial, left side perspective view of the cable pulling mechanism of the winch unit of FIG. 2, with the mast deployed.

Cable 55 is wound about drums 51, 52 and its leading end comes off of front drum 52 as shown and enters a pivot mechanism 53. Pivot mechanism 53 includes a pair of aligned, spaced vertical mounting plates 54 that are rigidly secured to frame 22. Each plate 54 has an array of spaced holes 56. A rectangular reinforcing plate 57 is mounted to two adjoining holes 56 by means of a pin 58 and an axle 59. As shown in FIG. 11, these structures are duplicated on the left and right side of the device so that the cable may pass through the center. Thus there are two axles 59, one mounted on each plate 54.

A pivoting bracket 61 includes left and right side plates 62, 63 united by a cylindrical crossbar 64. Each plate 54 has a bearing sleeve 66 in which one of the axles 59 turns. A pair of projections 67 extend from one each of plates 62, 63 and are rigidly secured at their ends to a bearing sleeve 68 oriented at a right angle relative to crossbar 64 and axles 59. Projections 67 extend rearwardly when the mast is stowed as in FIG. 8, and extend downwardly when the mast is deployed as in FIG. 9. An ear 69 of frame 61 extends rearwardly and downwardly in the position shown in FIG. 8. Ear 69 is connected to the end of a hydraulic cylinder 71 that is attached to frame 22 and receives fluid in the same manner as the other devices described above.

A swing frame 72 is mounted on pivoting bracket 61 by means of bearing sleeve 68. Swing frame 72 includes a pair of symmetrical side plates 73, a rear end wall 74 and a pair of lateral support plates 76, 77 than span plates 73 to form a generally rectangular structure. Plates 76, 77 have aligned holes therein in which a pair of end caps 78, 79 are mounted and then welded into place. Through holes 81, 82 of end caps 78, 79 are aligned with the interior of bearing sleeve 68, and a pivot 83 is inserted therein to complete the assembly. Pivot pin 83 is secured to outer end cap 81 by any suitable means, such as a crosswise bolt (not shown) inserted through aligned apertures 85 in pin 83 and end cap 81. A further axle 84 spans plates 76, 77 at an intermediate location and has a sheave 86 rotatably mounted thereon for guiding the cable 55 as explained hereafter. By means of pivot 83, swing frame 72 can swing from side to side relative to bracket 61. Swing frame 72 and pivot mechanism 53 together provide the mounting assembly by which the top mast section 92 is secured to the frame 22.

Figure 9:
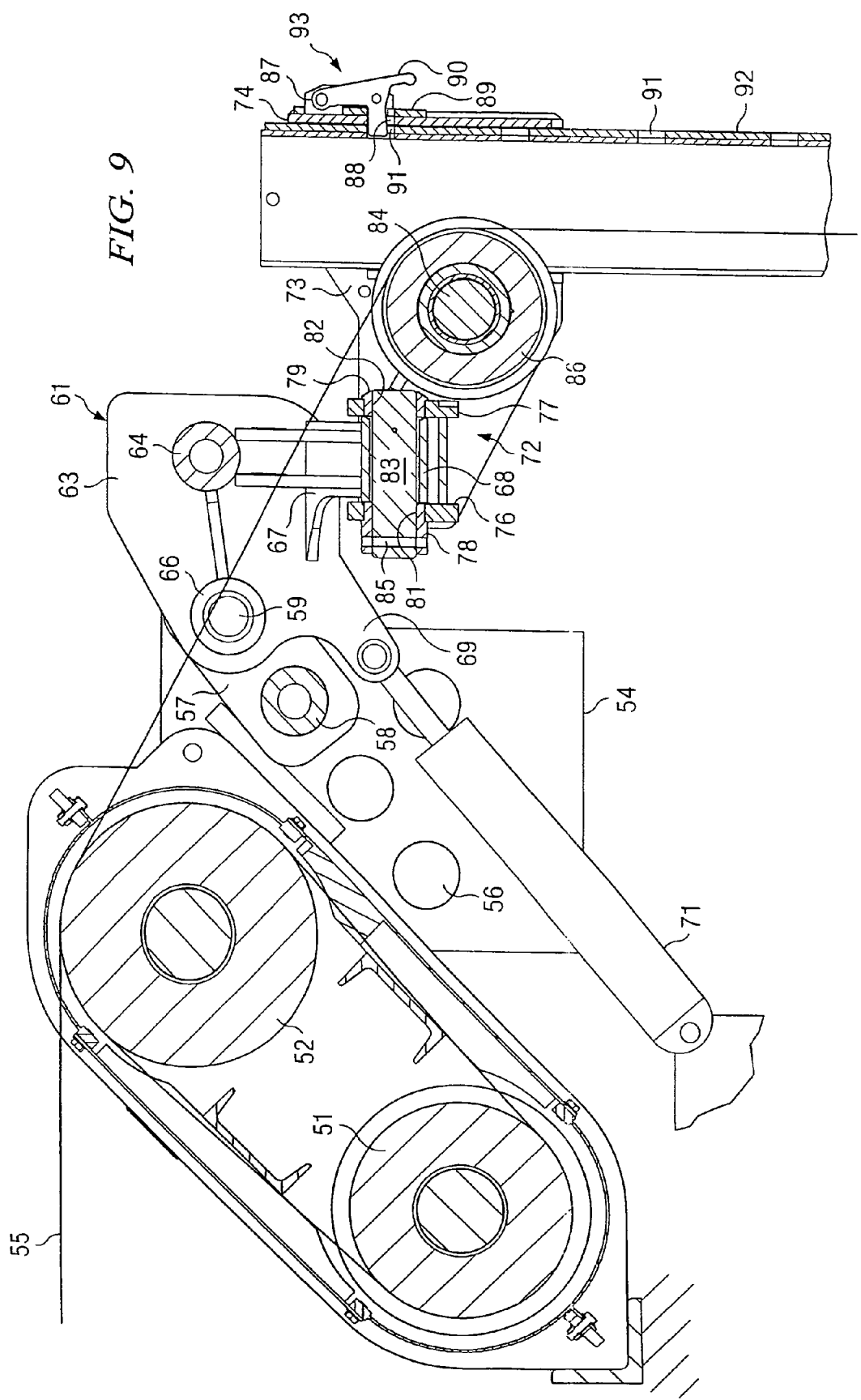
FIG. 9 is a partial, right side lengthwise sectional view of the cable pulling mechanism of the winch unit of FIG. 2, with the mast deployed.
Figure 10:
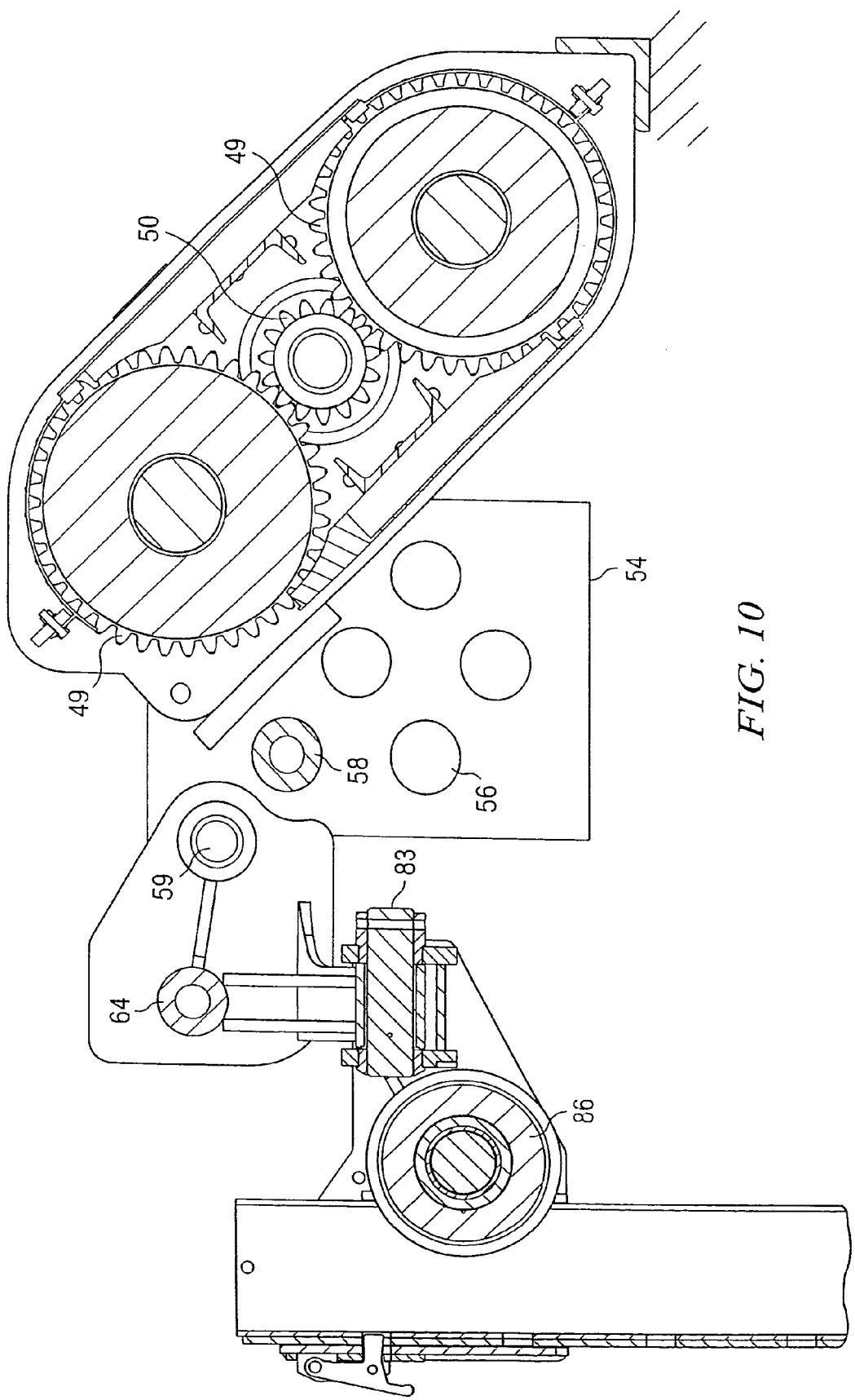
FIG. 10 is a partial, left side lengthwise sectional view of the cable pulling mechanism of the winch unit of FIG. 2, with the mast deployed.

Swing frame 72 further has a latch mechanism 93 mounted on rear wall 74. Latch mechanism 93 includes a generally L-shaped latch 90 pivotally mounted at one end to a tab 87 extending outwardly from rear wall 74. Latch 90 extends through a hole 88 in wall 74, which is strengthened by a reinforcing strip 89, and into an aligned hole 91 in an outer mast section 92. By this means, sliding movement of mast section 92 relative to swing frame 72 is prevented unless latch 76 is lifted to permit removal or adjustment of outer mast section 92. Mast section 92 is normally mounted so that the last in the series of holes 91 is engaged by latch 76, as shown in FIG. 9.

Mast assembly 32 includes two or more telescoping mast sections, in this example upper mast section 92, middle mast section 94, and lower mast section 96. These mast sections are generally hollow rectangular steel beams of progressively decreasing dimensions in cross-section each having sufficient strength to support the cable tension during pipe bursting. FIGS. 13-16 illustrate an upper joint 95 formed by masts 92, 94. An outer wall 101 of upper mast 92 has a series of holes 91 therein along with reinforcing strip 89, which comprises a contiguous series of hourglass-shaped sections with holes 91 located through the widened portions. A pair of side walls 102 have holes 103 near the lower ends thereof through which a pair of stops 104 are secured, such as by bolts mounted in aligned holes 106. As shown in FIG. 16, an upper end portion 107 of middle mast 94 is widened, as by welding additional plates 108 thereon in position to engage stops 104 when mast 94 is fully extended. Stops 104 and plates 108 prevent masts 92, 94 from becoming disengaged unless stops 104 are first removed. A rear wall 100 has a lengthwise groove 105 therein, and mast sections 94 and 96 have similar grooves therein to accommodate sheave 86, which protrudes part way inside of the mast assembly (see FIG. 8). Preferably, these grooves 105 extend more than half the length of each mast section 92, 94, 96. This permits repositioning of the mast assembly 32 in a greater variety of positions while permitting cable 55 free access to the interior of the mast assembly 32. As shown in FIG. 8, grooves 105 extend from an upper end of mast sections 92, 94, 96 to the point where sheave 86 is positioned when the mast assembly 32 is in its stowed position.

In the case of an unusually shallow pipe line that is only a few feet beneath the surface, conventional mast assemblies in fixed length sections may be too long to access the pipeline. According to the invention, latch 90 may be actuated and the position of mast assembly 32 relative to swing frame 72 may be adjusted upwardly so that latch 90 engages one of the holes 91 further down than the top one shown. In this manner the mast assembly can be used to access a shallow pipeline at a depth that is less than the length of the outermost (top) mast section 92.

An outer wall 109 of middle mast 94 has a series of holes 110 therein which can be moved into alignment with holes 91. A latch mechanism 111 similar to latch mechanism 74 includes a pivoting latch 112 mounted near the lower end of outer wall 101. When mast 94 is fully extended, latch 112 is manually moved into engagement with aligned holes 91, 110 so that the mast sections 92, 94 are secured in the extended position. The joint between lower mast section 96 and middle section 94 is secured in the same manner using a latch 113.

Referring to FIGS. 17-27, foot assembly 34 is secured at the lower end of lower mast section 96. Foot assembly 34 includes a generally fan shaped frame 121 including a pair of parallel vertical plates 122 leading up to a horizontal top plate 123 that has a pair of rearwardly protruding rounded corners 124. A central cylindrical boss 126 extends up from top plate 123 into a socket 127 in the lower end of mast section 96. The lower end of mast section 96 has a circular flange 128 positioned to abut face to face with plate 123 when boss 126 is fully inserted into socket 127. A pair of hooks 129 are mounted on brackets 131 attached below plate 123 on opposite sides of plate 123. Hooks 129 are pivotally mounted by pins in lower holes 132 through brackets 131. In this manner, hooks 129 can be manually moved up and over the top side of flange 128 and secured therein by a second pair of pins inserted through upper holes 133 in brackets 131. Once so secured, foot assembly 34 hangs from lower mast section 94. Preferably there is a slight clearance between flange 128 and plate 123, permitting swiveling of foot assembly 34 with boss 126 turning inside of socket 127.

Figure 21:
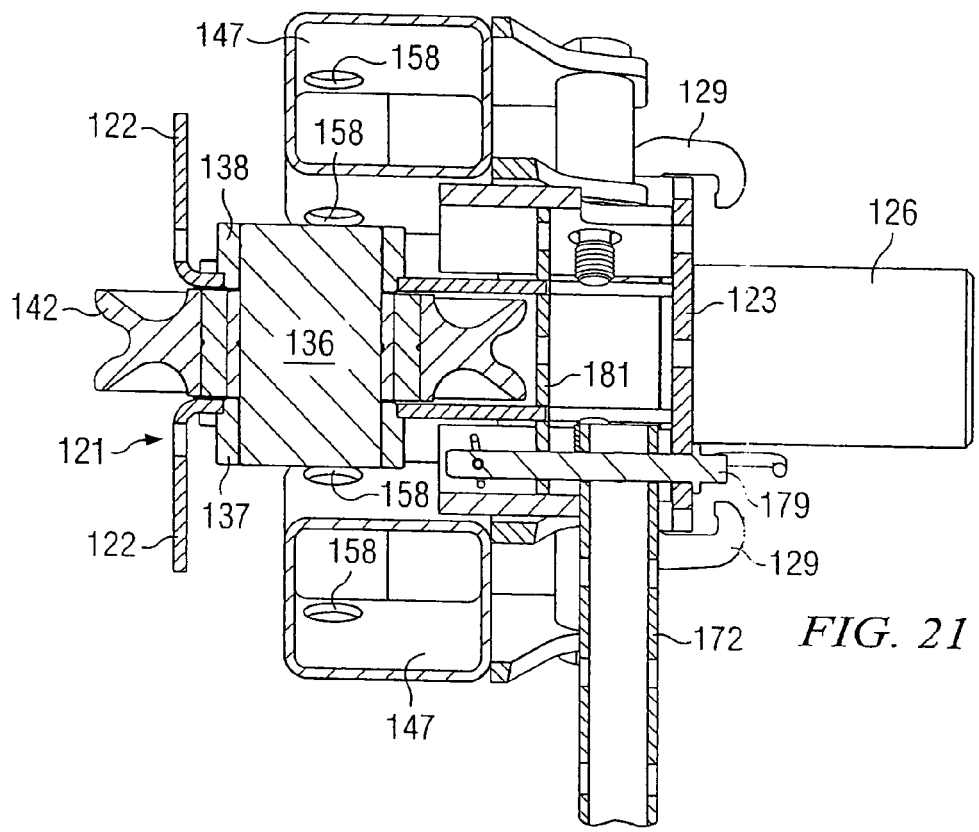
FIG. 21 is a cross sectional view taken along the line 21-21 in FIG. 18.
Figure 22:
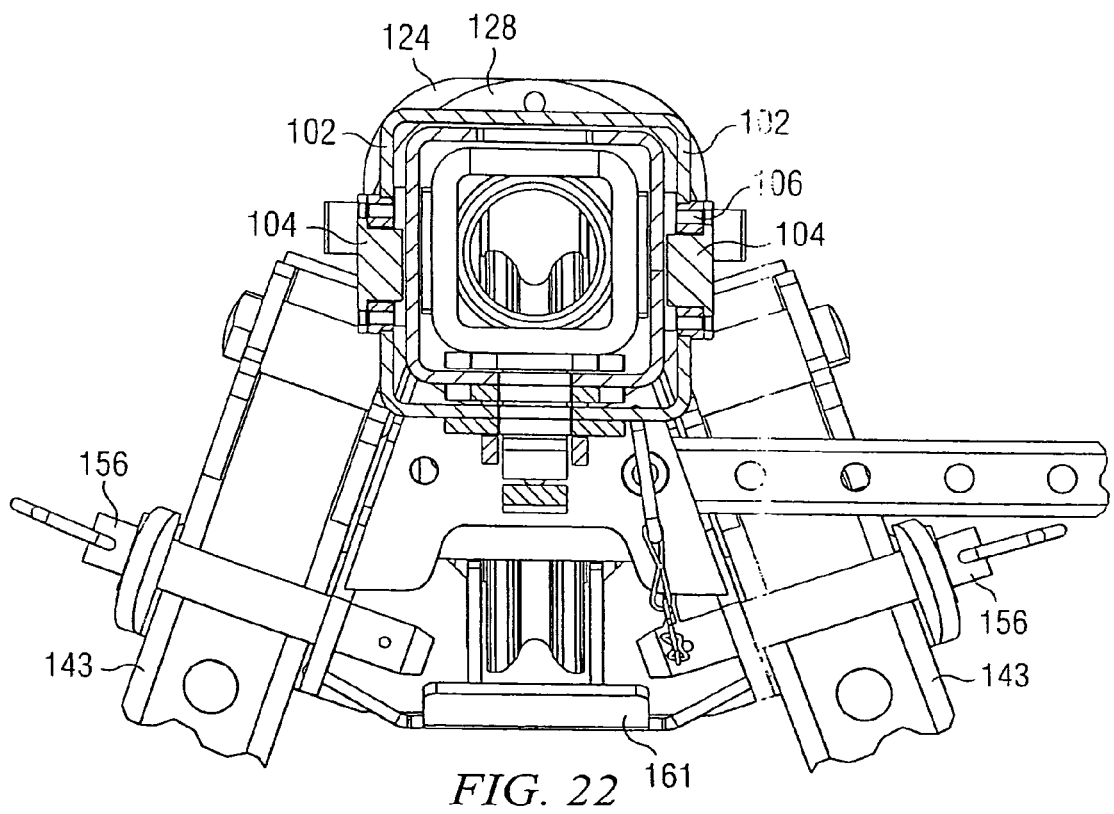
FIG. 22 is a partial top view of the foot and mast assembly of FIG. 12, with the mast in cross section.

As shown in FIG. 21, a large transverse axle 136 has a pair of end caps 137, 138 welded to its ends, which end caps are in turn secured to frame 121. One or more bearings 139 are mounted to support an upright sheave 142 rotatably on axle 136. Sheave 142 is the last of a series of sheaves used for guiding the cable, as explained hereafter. Frame 121 also has a pair of aligned holes 130 at the lower corners of plates 122 in which a pin may be removably mounted to retain the cable inside frame 121. Such a pin may also be used as a connection point for the cable when raising and lowering the mast, or such a connection point may be located at any convenient location elsewhere on foot assembly 34 or lower mast section 94.

Foot assembly 34 includes a pair of extendable, foldable feet 143 extending laterally from one side thereof. Feet 143 are positioned symmetrically on either side of sheave 142 and define an angle of up to 180° relative to one another, more typically from 20°-90°. Each foot 143 comprises a pair of telescoping, front and rear legs 144, 146. Each rear leg 146 is pivotally mounted in a U-shaped side channel 147 of frame 121. Legs 144, 146 have rows of alignable holes 148, 149 along the top and bottom walls thereof whereby the length of each foot 143 may be adjusted using a pin 151 through a pair of aligned holes 148, 149. Pin 151 and other similar other similar pins shown may be secured using cotter pins.

Figure 17:
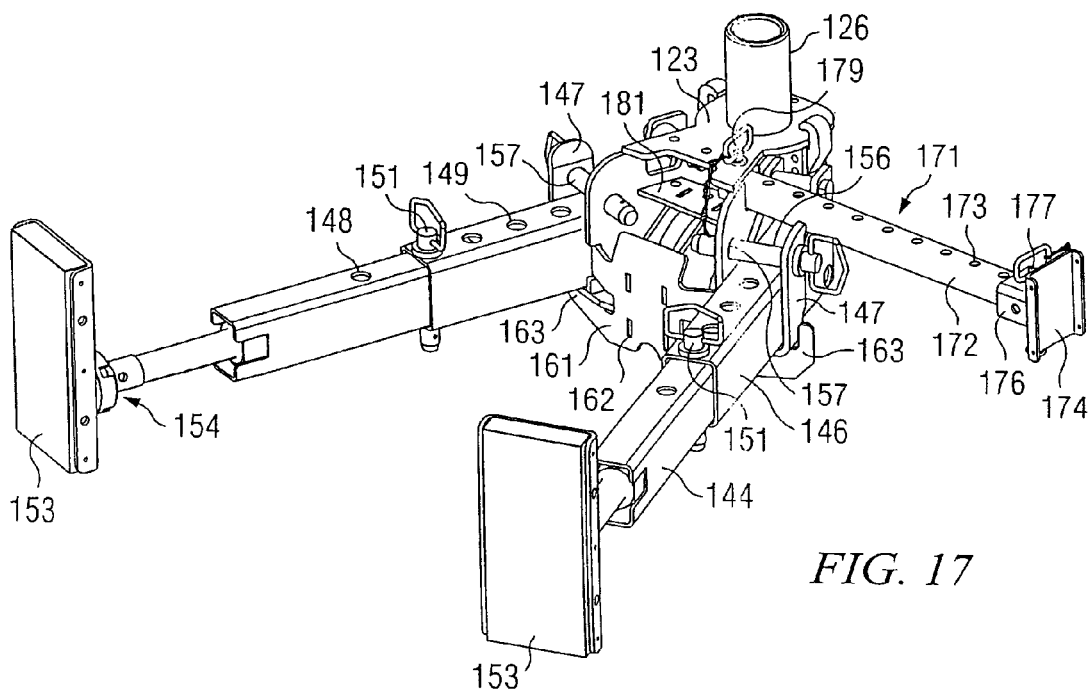
FIG. 17 is a rear perspective view of the foot assembly shown in FIG. 12.
Figure 18:
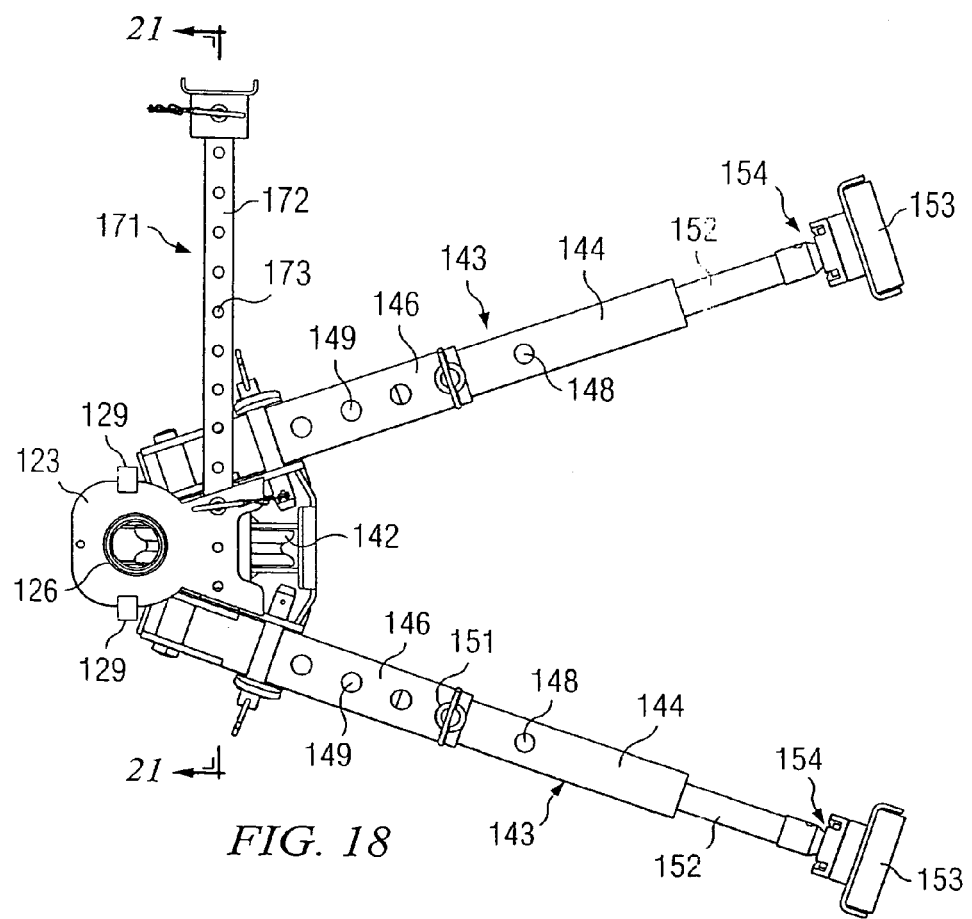
FIG. 18 is a top view of the foot assembly shown in FIG. 17.
Figure 19:
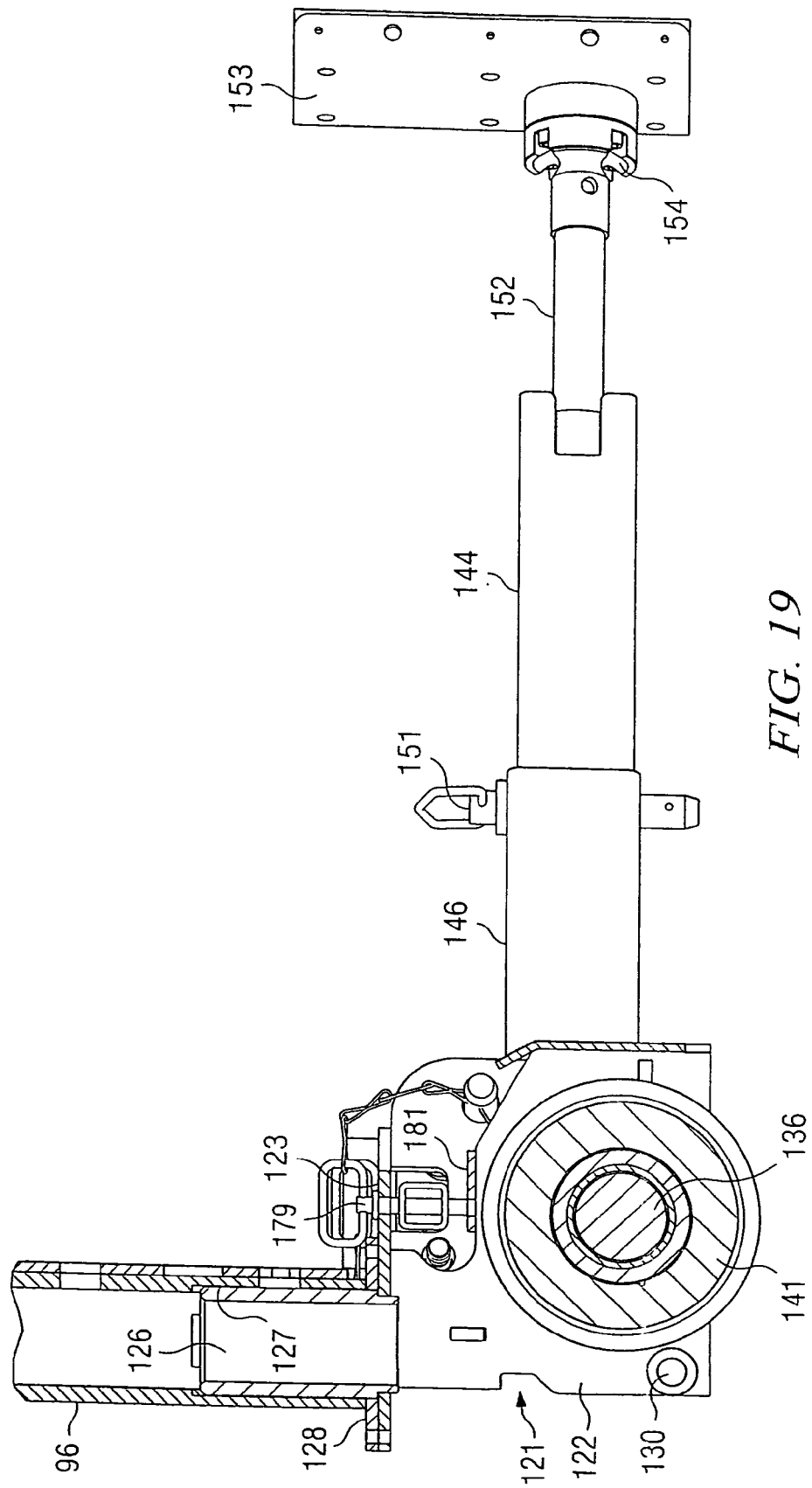
FIG. 19 is a side view, partly in section, of the foot assembly shown in FIG. 12.
Figure 20:
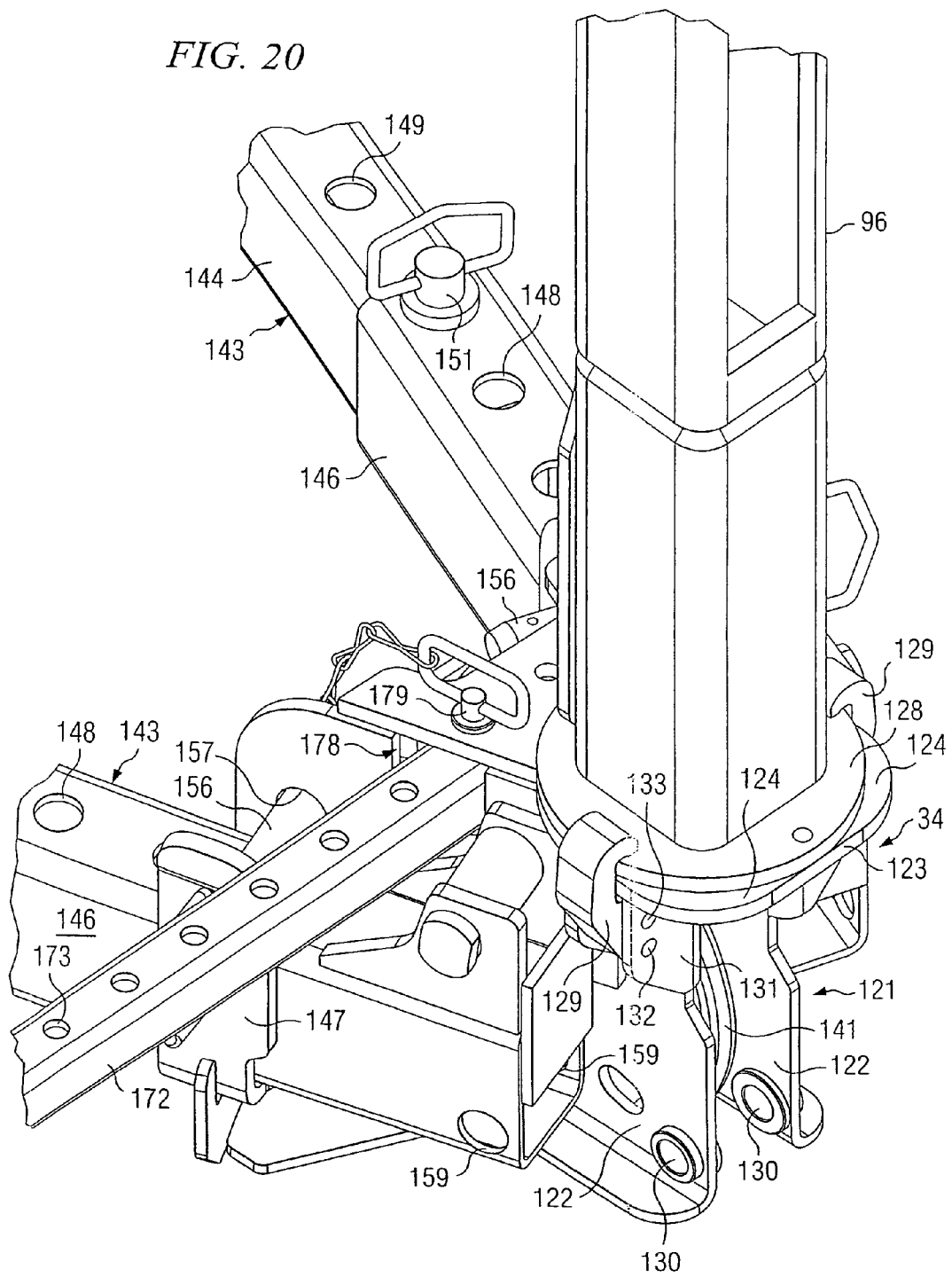
FIG. 20 is a partial, front perspective view of the foot assembly shown in FIG. 12.

The distal end of front leg 144 may comprise a solid rod 152 having a reaction plate 153 mounted thereon for bracing against the wall of a hole. Plates 153 may be mounted by means of ball joints 154 that permit swiveling of plate 153 in one or more directions relative to rod 152. A cover 161 spans and supports channels 147 and has a central notch 162 through which the cable comes off of sheave 142. Cover 161 is attached to plates 122 at attachment slots 162, and has wings 163 which pass underneath channels 147 as shown in FIG. 17.

Figure 23:
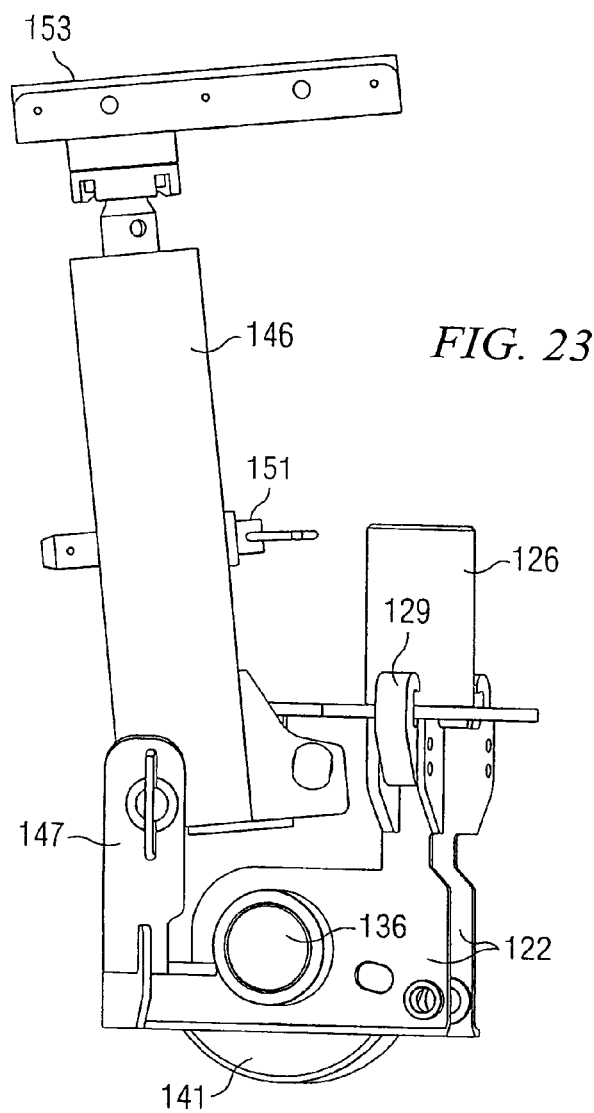
FIG. 23 is a side view of the foot assembly of FIG. 12, with the legs in stowed position.

Feet 143 are locked into horizontal positions by means of pins 156 mounted in holes 157 along the upper sides of each channel 147. In order to fold up feet 143 for storage, pins 156 are removed and feet 143 are pivoted upwardly by almost 90° (FIG. 23). Once in this position, pins 156 are replaced in a second set of holes 158 and corresponding holes 159 through rear legs 146 to hold feet 143 in their stowed positions.

An optional side brace assembly 171 may be provided as needed to brace foot assembly 34 against one side wall of the manhole or other excavation. Side brace comprises a beam 172 having upper and lower rows of spaced attachment holes 173 therein. A removable foot assembly includes a reaction plate 174 and a socket 176 in which a distal end of beam 172 is inserted and secured with a pin 177. The other end of beam 172 is inserted through a side opening 178 in frame 121 such that it passes over the top of the adjoining leg 146 when in the deployed position. A pin 179 passes through a pair of holes 173 and through corresponding holes in top plate 123 and an intermediate plate 181 of frame 121 (see FIGS. 17, 19). In this manner, the length of side brace 171 may be adjusted as needed, and different reaction plate devices can be used. When it is desired to fold up foot assembly 34 to its stowed position, brace assembly 171 can be completely removed by pulling a pin 179 and removing beam 172 from opening 178.

Referring again to FIGS. 8-9, the wire rope or cable 55 comes off of drums 51, 52 at an upper side of drum 52 and is wound about crossbar 64. It then passes upwardly into swing frame 72 in tangential contact with sheave 86, then forwardly along the inside of lower mast section 96, which is the innermost mast section when the machine is in its stowed position. Cable 55 passes through the center of cylindrical boss 96 and into foot assembly 34, where it is wound about sheave 142 and comes out through notch 162. At this point, the free end of cable 55 can be secured in any desired manner, e.g. bolted to an eye mounted for that purpose, or simply tied about the mast assembly in a secure manner. Cable 55 passes between the side plates of pivot mechanism 53 and swing frame 72 and is confined therebetween.

Figure 24:
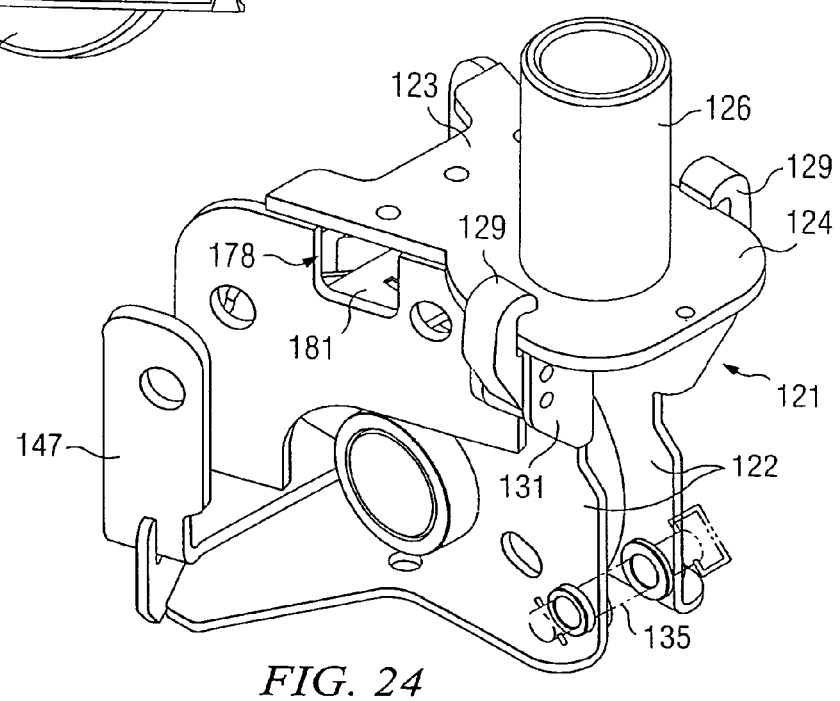
FIG. 24 is a rear perspective view of the frame of the of the foot assembly of FIG. 12.

When it is time to deploy the mast, the free end cable 55 is first secured to foot assembly 34, such as by means of a pin 135 set through holes 130 (see FIG. 24 showing pin 135 in phantom). In the alternative, hardware at the distal end of the cable 55 will normally prevent its end from fitting between pin 135 and sheave 141. If pin 135 if left in place, then no special point of attachment for the free end of cable 55 is needed in order to raise and lower the telescoping mast.

Figure 12:
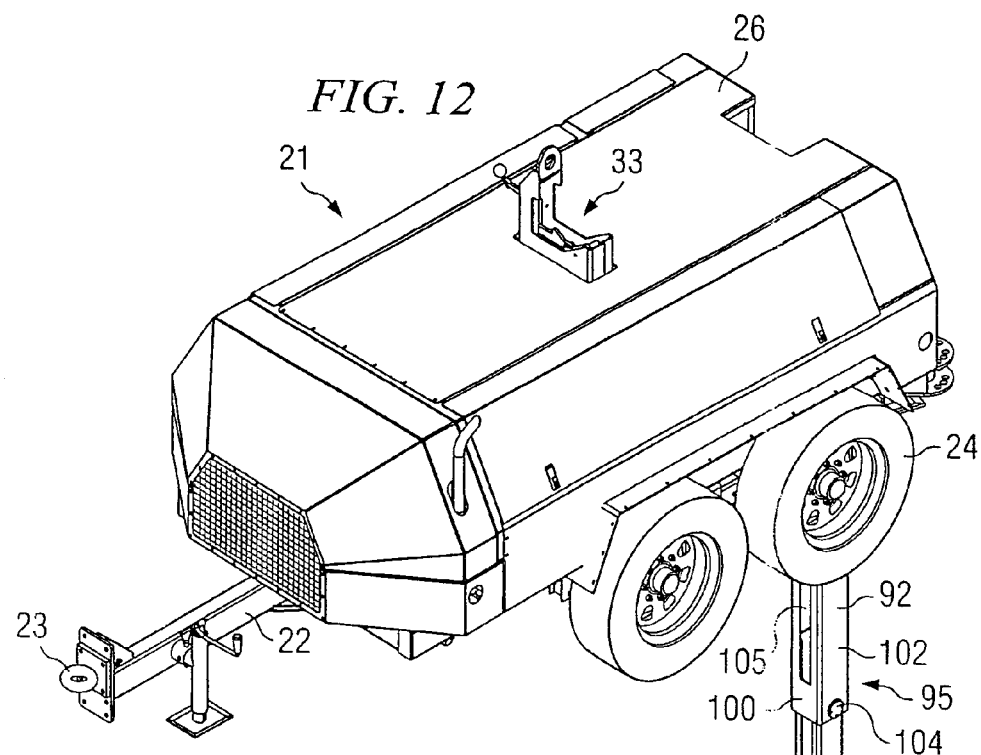
FIG. 12 is a perspective view of the winch unit shown in FIG. 1, with the mast deployed.
Figure 12:
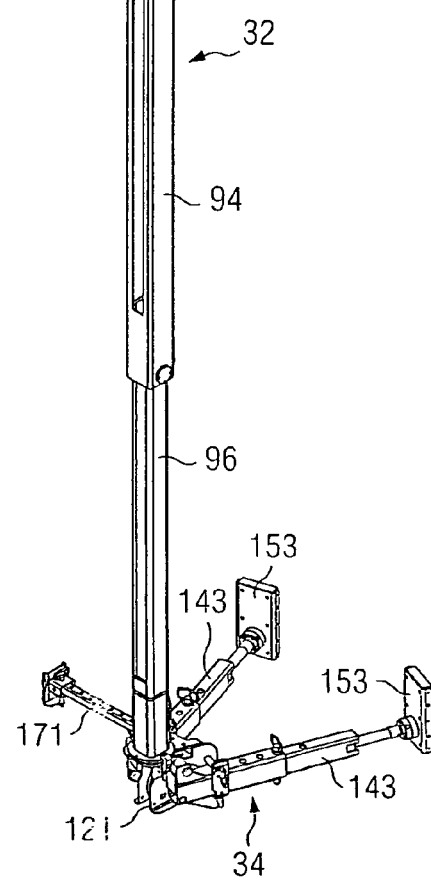

Upon retraction of cylinder 71, bracket 61 pivots about axles 59, carrying with it swing frame 72, mast assembly 32 and foot assembly 34. This moves mast assembly 32 from a horizontal to a vertical position. Lowermost latch 113 is then unfastened, and lower leg section 96 is lowered as cable 55 is gradually payed out. The cable acts against the force of gravity, assuring that mast section 96 is lowered at a controlled pace. The process continues until mast section 96 is fully extended, at which time latch 113 is reset and second latch 112 is released so that middle mast section 94 begins to extend from the inside of top mast section 92. When the lower and middle mast sections are fully extended, latch 112 is reset to lock the extended mast in position as shown in FIG. 12.

Foot assembly 34 may then be deployed at the bottom of the hole by unfolding and setting feet 143, and setting side brace 171 if needed. Side brace 171 is particularly useful when the machine is positioned on uneven terrain such as a hill side, and needs to be braced against lateral movement of the mast. Side brace 171 is also used in situations where it is necessary to set up the telescoping mast 32 at an angle other than 90° in order to reach the pipeline, which may be offset from the manhole entrance. It is known in the art in such situations to manually set up a winch mast and brace it at an angle. The present invention permits this with a mast assembly that does not need to be deployed manually. Pivot 83 permits mast assembly 32 of the invention to swing from side to side, and axle 59 permits mast assembly 32 of the invention to swing from front to back while remaining secured to frame 22. Thus, once mast assembly 32 is extended into a manhole having an offset pipeline, it is then pivoted at its top end up to about 15 degrees in either direction from side to side, and 15 degrees in either direction from front to back. Once the bottom end is at the desired location near the offset pipeline entrance, foot assembly 34 is then deployed. Side brace 171 is then used to brace mast assembly 32 in its angled position.

Feet 143 are extended so that reaction plates 151 engage the wall of the hole adjoining the existing conduit. As part of the process of bracing mast 32, hydraulic cylinder 71 is set to float to prevent undesirable loading on mast 32. The cable can then be extended from foot assembly 34 and the free end can be fed through the existing pipeline in a conventional manner. A mole is attached to the free end of the cable at the other end of the pipeline to be replaced, and the winch unit 21 is then used in its pulling mode to pull the mole and trailing plastic replacement through the existing pipeline. Once the burst is completed, the mole is detached and the cable reattached to foot assembly 34. Side brace 171 is removed and feet 143 are collapsed, pivoted upright and secured in position. Latches 112, 113 are unlocked either at the same time or 113 first followed by 112, in the reverse of the deployment procedure. Winch mechanism 27 is then actuated to reel in cable 55, which lifts lower mast section 96 sliding it upwardly inside of mast section 94. The process is then repeated with mast sections 92, 94 until the mast assembly 32 has returned to a fully collapsed state. At this point, cylinder 71 is extended, reversing the previous motion and returning mast assembly 32 to its horizontal stowed position. It is often desirable to remove the mast assembly from the hole prior to removing the mole, which may be a relatively small bursting head or a larger device such as an impact bursting tool such as a pneumatic hammer.

Figure 5:
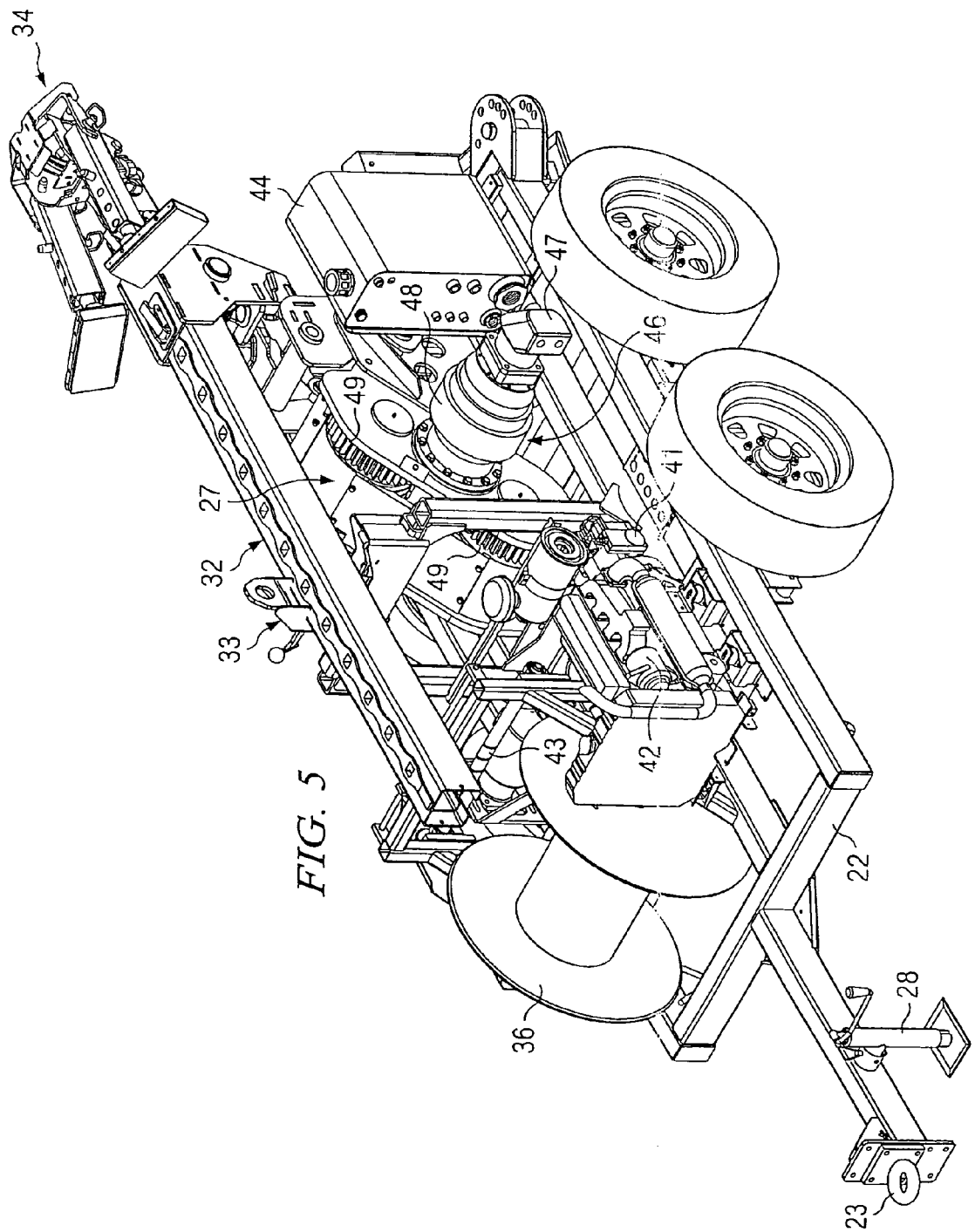
FIG. 5 is a perspective view of the winch unit shown in FIG. 1, with the housing removed.
Figure 6:
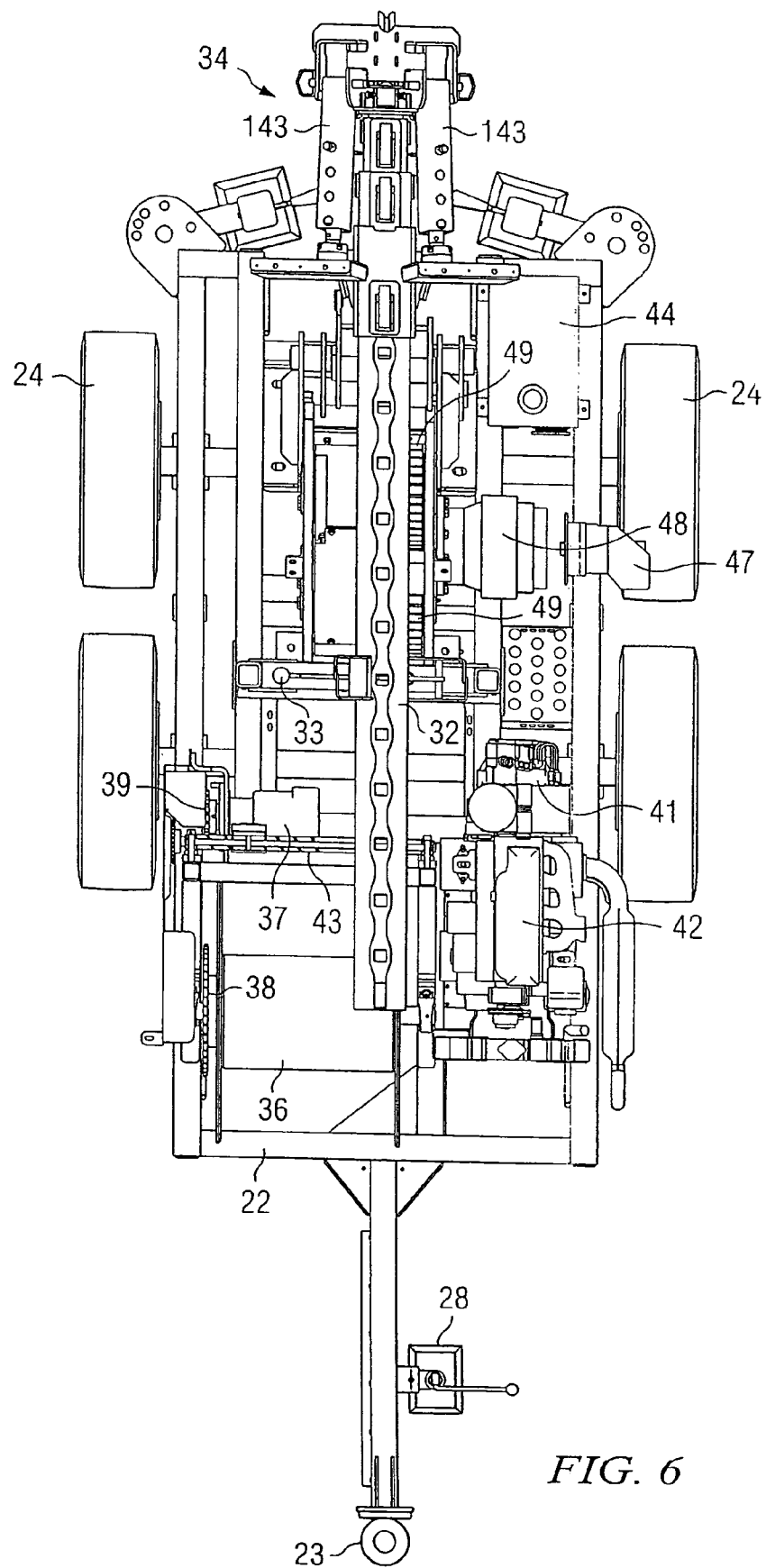
FIG. 6 is a top view of the winch unit shown in FIG. 5.
Figure 7:
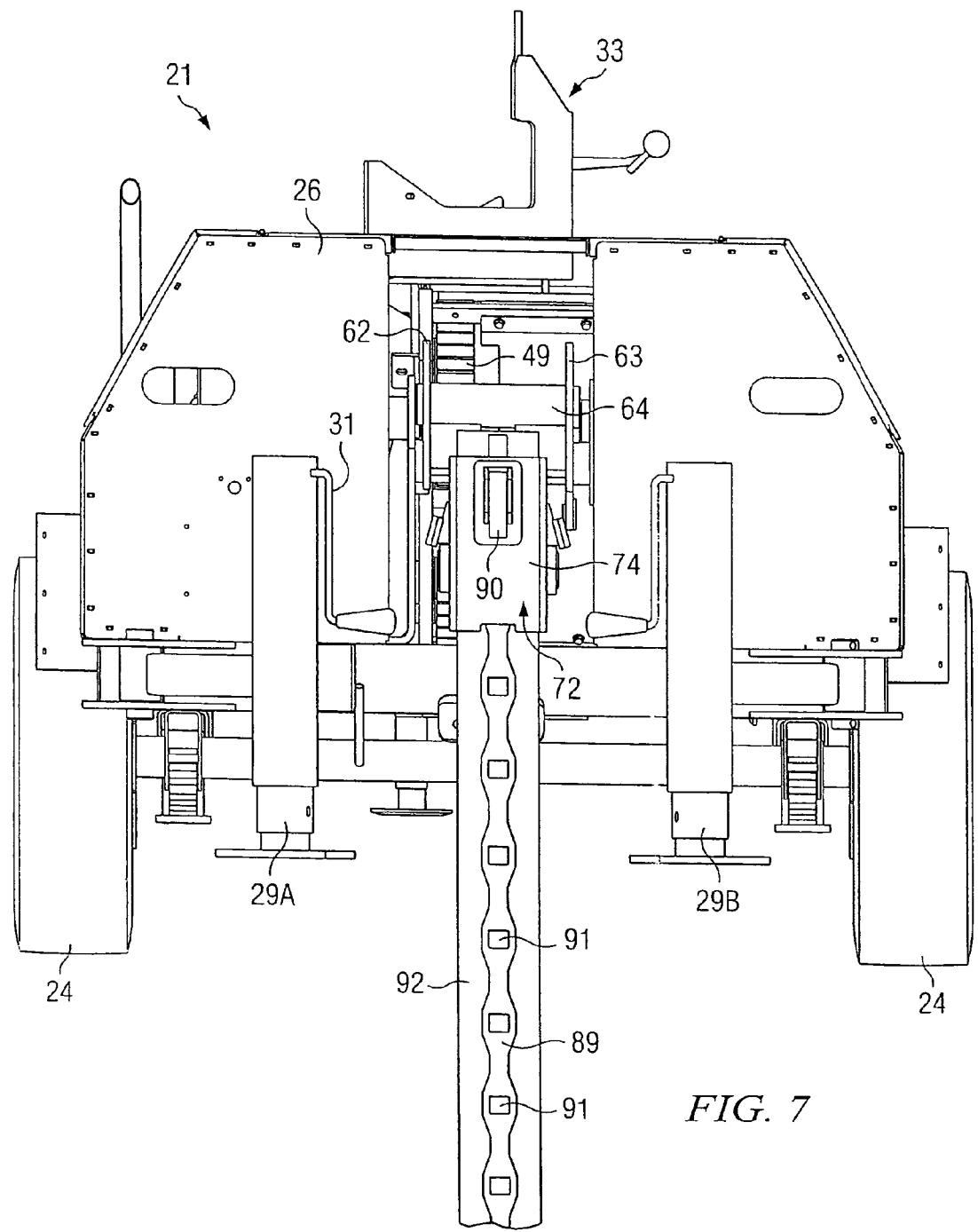
FIG. 7 is a partial rear view of the winch unit of FIG. 1 with the mast in its deployed position.
Figure 12A:
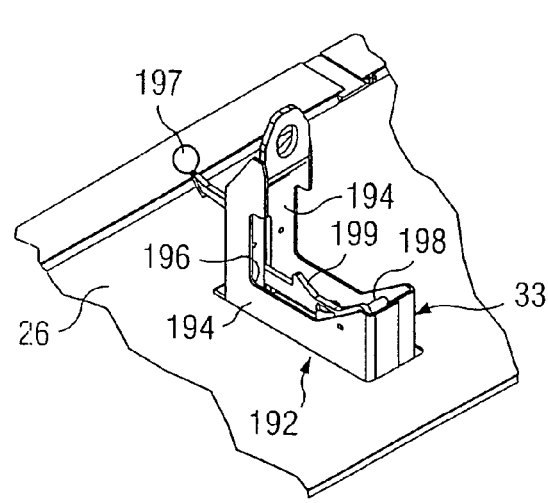
FIG. 12A is an enlarged view of the mast holding mechanism shown in FIG. 12.

At this point, an optional latch mechanism 33 provided on top of vehicle housing 26 may be used to secure the collapsed mast assembly 32. As shown in FIGS. 5, 12A, and 12B, latch mechanism 33 includes an L-shaped bracket 192 mounted on frame 22 and a movable latch 193. Bracket 192 comprises a pair of parallel plates 194 profiled to form a cradle 196 defined by upper, lower and side edges of plates 194. Latch 193 extends outwardly between plates 194 ending in a handle 197. The inner end of latch 193 is pivotally mounted on a crosspin 198 secured to bracket 192. Latch has an upwardly extending finger 199 positioned to extend upwardly into the middle of cradle 196. Once mast assembly 32 is in its horizontal position, it is resting in cradle 196 with latch 193 in a down position. Latch 193 is then raised, moving it into engagement with mast assembly 32 such that finger 199 in inserted into grooves 105, retaining mast assembly 32 until latch 193 is lowered. Latch 193 may be secured in a raised position by any suitable means, such as a spring 201 that biases latch 193 towards the raised position, or a mechanical locking mechanism. Finger 199 may also be relocated inwardly to engage an outer wall of mast assembly, trapping it on the fourth side not covered by cradle 196.

Figure 28:
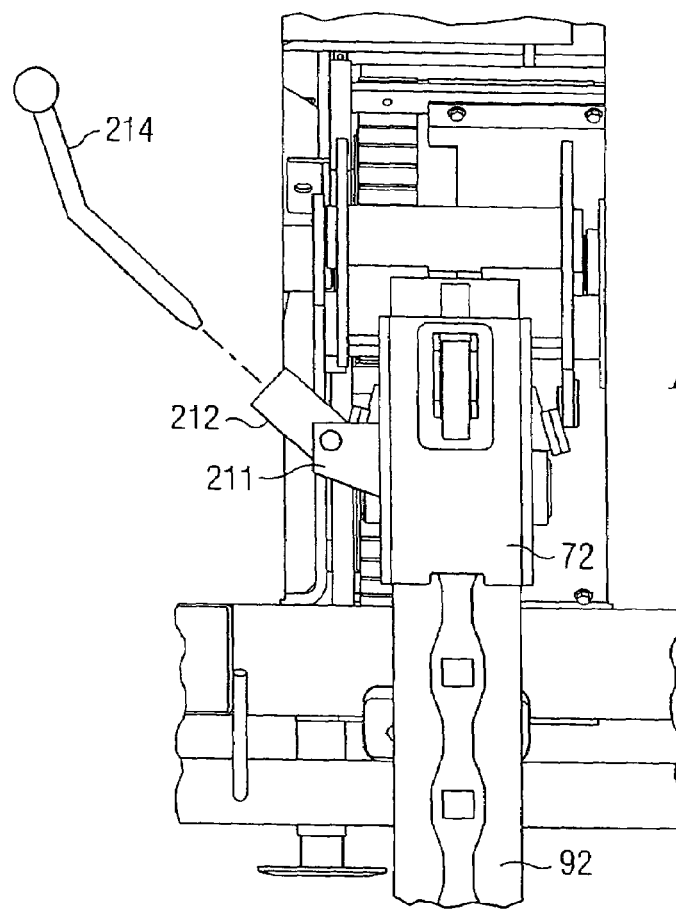
FIG. 28 is a partial rear view according to an alternative embodiment of the invention showing the top of the upper mast.
Figure 29:
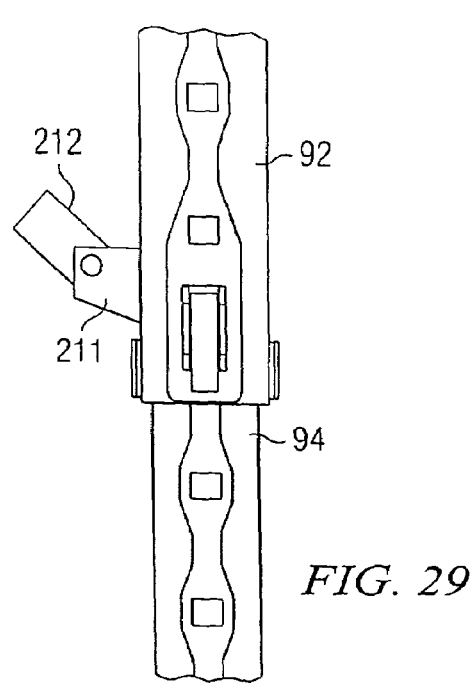
FIG. 29 is a partial rear view at the lower end of the upper mast shown in FIG. 28.
Figure 30:
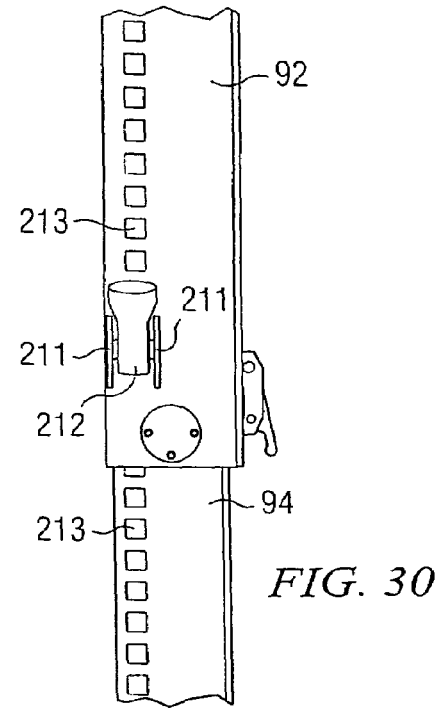
FIG. 30 is a partial side view of the lower end of the upper mast shown in FIG. 29.

Use of the winch's wire rope to raise and lower the telescoping mast as well as the down hole sheave (leg assembly) eliminates the need for an additional piece of equipment to accomplish this. However, it will be understood by those skilled in the art that other means could be provided for raising and lowering the mast without using the main winch for this purpose. For example, the upper two mast sections 92, 94 and the swing frame 72 can each be provided with an automotive-style jack mechanism as shown in FIGS. 28-30. Swing frame 72 has a bracket 211 and jack mechanism 212 on its side wall. Jack mechanism 212 engages a series of holes 213 provided on all three mast sections, moving from one hole to the next each time the jack mechanism 212 is actuated with a lever 214. The arrangement for masts 94, 96 is identical to that shown for masts 92, 94 in FIGS. 29, 30. This embodiment is viable but is not as desirable as a powered system which can extend and collapse the telescoping mast automatically.

Figure 31:
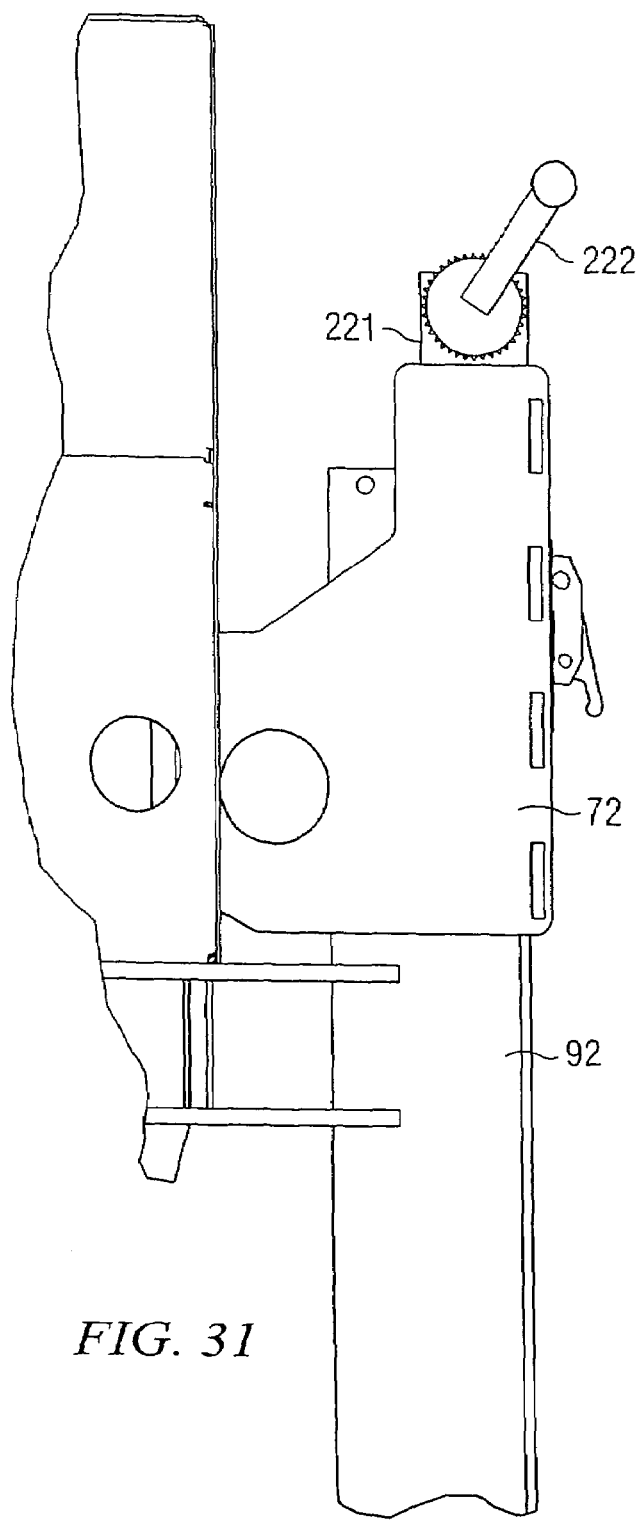
FIG. 31 is a partial side view according to a further alternative embodiment of the invention showing the top of the upper mast.
Figure 32:
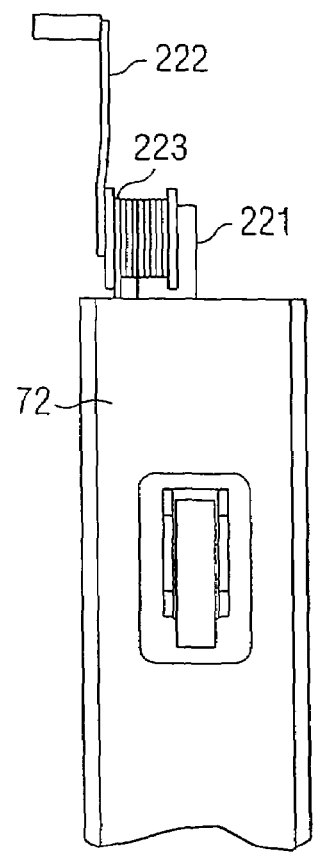
FIG. 32 is an enlarged, partial rear view of the upper mast shown in FIG. 31.

FIGS. 31-32 illustrate another alternative embodiment wherein a mechanical winch similar to a conventional boat trailer winch is used to raise and lower the mast. The winch mechanism 221 includes a crank 222 that is turned manually to raise and lower the telescoping mast sections. It may be conveniently mounted as shown so that a secondary cable 223 runs down near a side or corner of the telescoping mast, away from the main cable 55, which is much thicker. An eye at the end of secondary cable 223 may be permanently mounted on pin 135, or at any other convenient location.

The apparatus of the invention provides a number of advantages during the bursting process. The invention eliminates handling of the mast sections much as a bucket type man-lift truck eliminates the need to handle ladders when servicing utility poles. The mast must extend to the bottom of the manhole, typically this is in the range of 6 to 20 feet from the surface. As a typical winch of the size and type used in pipe bursting is approximately 9 feet long not including it's trailer tongue, the mast cannot conveniently be any longer than 9 feet. To achieve the depths required, the mast must have sections. By telescoping these sections, placing a larger one over a smaller one and again over a smallest mast, the design can be achieved. In practice, it has been found that this telescoping mast is best pivoted about an axis at the rear of the winch for storage. By laying on top of the winch for travel, the overall height is kept considerably below the 9 foot mast height, a feature useful for access to tight job sites as well as enhancing safety during transport.

The winch of the invention is backed up to a manhole, the engine is started, and the operator toggles a switch after unlatching the mast from its storage cradle. The switch trips a hydraulic valve allowing actuation of the cylinder that pivots the mast into the upright position. Upon achieving that, the first latch is disengaged and the inner mast is lowered by feeding wire rope off the winch storage drum. When the mast has reached it's full extension, the first latch is engaged and the process repeated for the second section. When the desired depth has been achieved, the second latch is engaged. The engagement of the latches makes the telescoping mast capable of being structurally loaded by the cable tension. This setup process took one operator approximately three minutes. The old mast design wherein the mast sections had be lowered and assembled in the hole took three men a total of three man hours of physical effort and a second piece of mobile equipment to lift the mast assembly.

Unique aspects of the invention include the use of a telescoping mast to achieve great depth (deployed mast length), but with reasonable length in the collapsed position for storage and transport. Pivoting of the collapsed mast assembly further enhances transportability. Use of latches on the mast provides column compression stiffness that allows the mast to be loaded structurally. The invention as such includes the foregoing, as well as those defined more specifically in the claims that follow.

The invention claimed is:

1. A portable winch, comprising:
a mounting frame positionable at a top opening of a hole;
a mast including at least upper and lower mast sections;
a swing frame connected by a pivot to the mounting frame and positioned to pivot the mast between a first storage position and a second operating position from which the mast is extendable into the hole;
a power winch mounted on the mounting frame to extend and retract a cable about a sheave connected to the lower mast section;
a first powered mechanism on the mounting frame that gradually raises and lowers the mast relative to the mounting frame into and out of the hole;
a second powered mechanism on the mounting frame hat pivots the swing frame between the storage and the operating positions; and
a control system by which an operator can operate the first and second powered mechanisms.

2. The winch of claim 1, wherein the mast sections are telescoping, and the raising and lowering mechanism comprises a second winch positioned for collapsing and extending the telescoping sections.

3. The winch of claim 1, wherein the mechanism for raising and lowering includes the power winch mounted on the mounting frame and a releaseable connector between the lower mast section and the cable.

4. The portable winch of claim 1, wherein the mounting frame comprises a wheeled trailer having a plurality of extendable jacks for supporting the mounting frame.

5. The portable winch of claim 1, wherein the second powered mechanism comprises a hydraulic cylinder having one end secured to the mounting frame and the other end secured to the swing frame.

6. The portable winch of claim 1, wherein the mounting frame is secured onto a vehicle, and the swing frame is positioned at a rear upper end of the mounting frame behind the power winch.

7. The portable winch of claim 6, wherein the swing frame comprises a pair of side plates which support the mast, and the swing frame further comprises a pivot by which it can swing from side to side.

8. The portable winch of claim 1, wherein the swing frame comprises a pair of side plates which support the mast.

9. The portable winch of claim 1, wherein the swing frame further comprises a pivot by which it can swing from side to side.

10. A portable winch, comprising:
a mounting frame positionable at a top opening of a hole;
a mast including at least upper and lower mast sections;
a swing frame connected by a pivot to the mounting frame and positioned to pivot the mast between a first storage position and a second operating position from which the mast is extendable into the hole;
a power winch mounted on the mounting frame to extend and retract a cable about a sheave connected to the lower mast section; and
a mechanism on the mounting frame that gradually raises and lowers the mast relative to the mounting frame into and out of the hole, wherein the upper mast section is slidably mounted on the swing frame, the winch further comprising a latch for securing the upper mast section in the swing frame at one of a plurality of predetermined locations.

11. The portable winch of claim 10, wherein the upper mast comprises a series of holes wherein the latch may be selectively engaged and a reinforcing strip for reinforcing the mast around one or more of the holes.

* * * * *